United States Patent [19]

Neeff

[11] 3,891,388

[45] June 24, 1975

[54] EXHAUST PROCESS FOR THE DYEING OF SYNTHETIC FIBRE MATERIALS

[75] Inventor: Rütger Neeff, Leverkusen, Germany

[73] Assignee: Bayer Aktiengesellschaft, Leverkusen-Bayerwerk, Germany

[22] Filed: Nov. 19, 1973

[21] Appl. No.: 416,867

Related U.S. Application Data

[63] Continuation of Ser. No. 161,282, July 9, 1971, abandoned.

[30] Foreign Application Priority Data

July 10, 1970 Germany............................ 2034264
May 18, 1971 Germany............................ 2124495
May 18, 1971 Germany............................ 2124496

[52] U.S. Cl. ............................. 8/39; 8/41; 8/42; 8/170; 8/174
[51] Int. Cl............................................. C09b 5/62
[58] Field of Search ............. 8/39, 41, 42, 170, 174

[56] References Cited

UNITED STATES PATENTS

| | | | |
|---|---|---|---|
| 3,524,718 | 8/1970 | Nador et al............................ | 8/170 |
| 3,623,834 | 11/1971 | Seuret et al............................ | 8/172 |
| 3,792,971 | 2/1974 | Neeff et al......................... | 8/174 X |

FOREIGN PATENTS OR APPLICATIONS

| | | |
|---|---|---|
| 1,581,325 | 9/1969 | France |
| 1,153,221 | 5/1969 | United Kingdom |
| 832,343 | 1/1970 | Canada |
| 1,952,535 | 4/1971 | Germany |
| 1,192,984 | 5/1970 | United Kingdom |

*Primary Examiner*—Benjamin R. Padgett
*Assistant Examiner*—P. A. Nelson
*Attorney, Agent, or Firm*—Plumley & Tyner

[57] ABSTRACT

Exhaust process for the dyeing of synthetic fibre materials from organic water-immiscible solvents wherein are used as dyestuffs sulphonamide group containing disperse dyestuffs. There are obtained without originating waste waters dyeings with excellent fastness to washing, rubbing, light and sublimation.

12 Claims, No Drawings

EXHAUST PROCESS FOR THE DYEING OF SYNTHETIC FIBRE MATERIALS

This is a continuation of application Ser. No. 161,282, filed July 9, 1971, now abandoned.

The invention relates to an exhaust process for the dyeing of synthetic fibre materials from organic water-immiscible solvents; more particularly it concerns an exhaust process for the dyeing of synthetic fibre materials from organic water-immisicible solvents wherein are used as dyestuffs disperse dyestuffs containing sulphonamide groups.

Organic water-immisible solvents suitable for the process according to the invention are those the boiling point of which lies between 40° and 170°C, e.g. aromatic hydrocarbons such as toluene, xylene; and halogenated hydrocarbons, especially aliphatic chlorinated hydrocarbons, such as methylene chloride, chloroform, carbon tetrachloride, 1,1-dichloroethane, 1,2-dichloroethane, 1,1,2-trichloroethane, 1,1,1,2-tetrachloroethane, 1,1,2,2-tetrachloroethane, pentachloroethane, 1-chloropropane, 2-chloropropane, 1,2-dichloropropane, 1,1,1-trichloropropane, 1-chlorobutane, 2-chlorobutane, 1,4-dichlorobutane, 1-chloro-2-methylpropane, 2-chloro-2-methylpropane or dichlorohexane; as well as aliphatic fluorinated and fluoro-chlorinated hydrocarbons, such as perflouro-n-hexane, 1,2,2-trifluoro-trichloroethane and trifluoro-pentachloropropane; aromatic chlorinated and fluorinated hydrocarbons, such as chlorobenzene, fluorobenzene, chlorotoluene and benzotrifluoride.

Tetrachloroethylene, trichloroethylene, 1,1,1-trichloroethane and 1,1,1-trichloropropane have proved particularly satisfactory. Mixtures of the said solvents can also be used.

The sulphonamide group-containing disperse dyestuffs to be used according to the invention may be based on any type of dyestuffs, provided these contain at least one sulphonamide group. The dyestuffs to be used according to the invention may belong, for example, to the series of metal-containing or metal-free mono- or polyazo dyestuffs or (azo)methine dyestuffs; to the series of anthraquinone dyestuffs and of condensation products thereof containing more than three fused rings; other suitable dyestuffs are oxanio, nitrodiphenylamine, naphthalic acid, di- and triphenylmethane dyestuffs; naphtholactam condensation dyestuffs, quinophthalone dyestuffs, and dyestuffs based on naphthoquinone and naphthoquinonimine; as well as other condensation dyestuffs. In addition to the sulphonamide groups required by definition, the dyestuffs may contain other conventional substituents, such as halogen, alkyl, cycloalkyl, aralkyl, aryl, alkoxy, nitre, sulphone, optionally substituted carboxamide groups, optionally substituted or acylated amino groups, alkylthio and arylthio, hydroxy, hydroxyalkyloxy, aminoalkyloxy, cyano, cyanoalkyl, and differently substituted alkyl, aryl, aralkyl radicals, and the like.

The dyestuffs contain one or more sulphonamide groups which are linked to the aromatic nuclei of the basic ring system of the dyestuff itself or to aryl; aralkyl, or aliphatic groupings in external positions. The number of sulphonamide groups preferably amounts to 1 to 3.

The sulphonamide groups are characterized by the formula

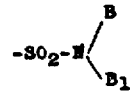

in which the radicals B and $B_1$, independently of one another, denote hydrogen or optionally substituted lower alkyl or alkenyl groups, aryl radicals or heteroaryl radicals. Furthermoreo, the radicals B and $B_1$ together may form a ring which may be interrupted by hetero atoms.

Examples of radicals B and $B_1$ are the methyl, ethyl or trifluoromethyl radicals; the $\beta$-hydroxy, $\beta$-chloro, $\beta$-bromo, $\beta$-methoxy, $\beta$-methylthio, $\beta$-methylsulphonyl or $\beta$-cyanoethyl groups; or an ethylene or $\beta$-chloro- or $\beta$-bromoethylene radical. If B or $B_1$ stands for an aryl radical, this is preferably a phenyl radical which may be substituted by one or more halogen atoms such as fluorine, chlorine or bromine; nitro groups; trifluoromethyl, hydroxy or lower alkoxy radicals; carboxyl or carboxamide groups; acylamino groups; sulphonamide or lower alkylsulphonyl radicals. Suitable heteroaryl radicals are, for example, the pyridyl, pyrrolyl, pyrimidinyl, furanyl, thienyl or sulpholanyl radicals. Examples of rings which may be formed by B and $B_1$ and may be interrupted by hetero atoms are the pyrrolidinyl, piperidinyl, morpholinyl, thiomorpholinyl or thiomorpholinyl dioxide rings.

Dyestuffs containing sulphonamide groups are known in large numbers and are prepared by conventional methods in that suitable dyesyuff intermediate containing one or more sulphonamide groups linked to the nucleus or in an external position are converted into the desired final products while retaining the sulphonamide groups and, if desired, further conversion reactions are carried out in the latter. Obviously, it is also possible to start from dyestuffs containing one or more sulphonic acid groups and to convert the sulphonic acid groups into the corresponding amides in the usual way via reactive intermediate stages, such as e.g. the ester and the acid chloride. In the case of aze dyestuffs, the usual conversion reactions are diazotisatien and coupling; for most other dyestuffs classes they are condensation reactions.

Examples of suitable azo dyestuffs containing sulphonamide groups are the following compounds in which the radical

may have the following meaning:

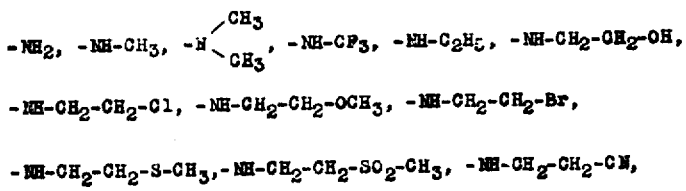

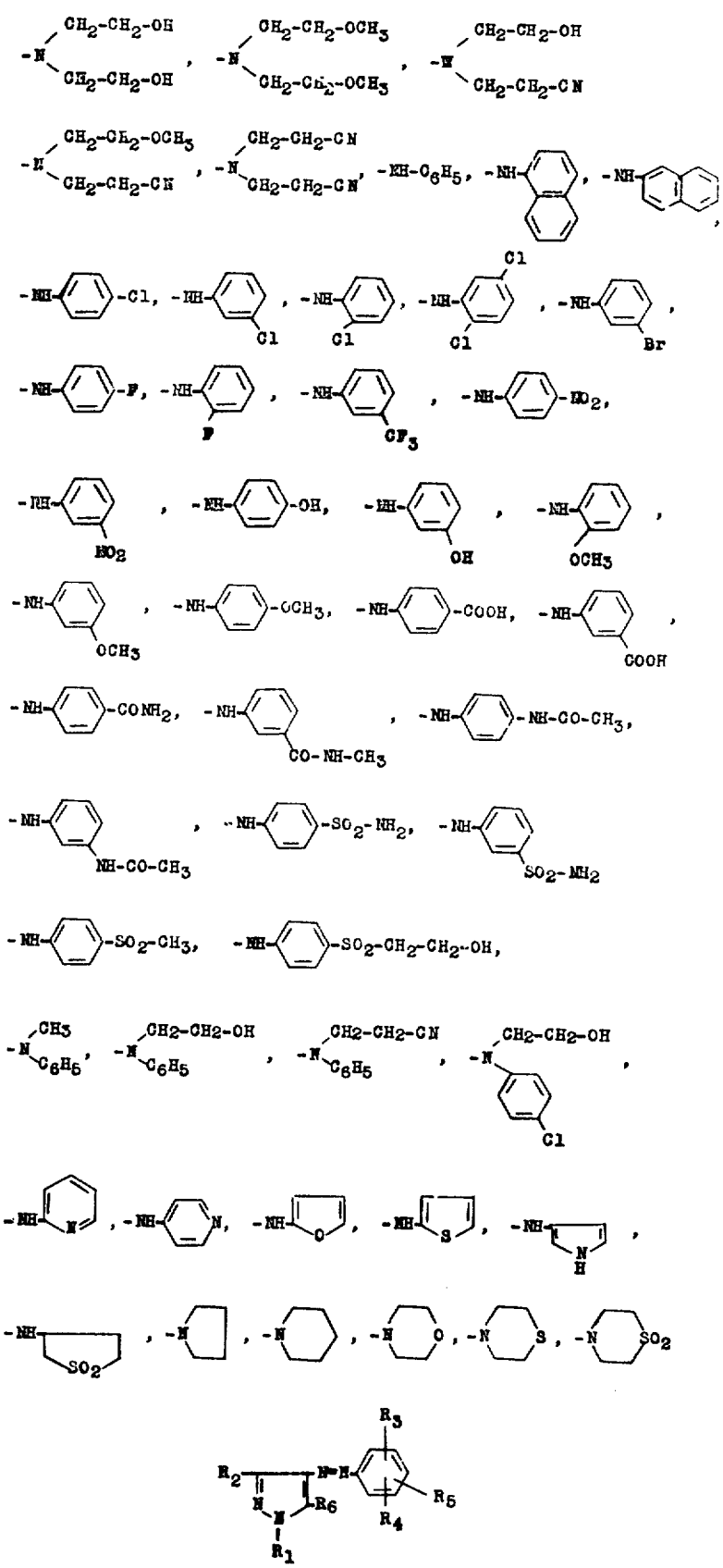

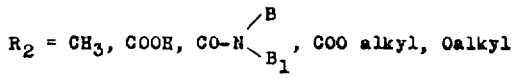

$R_3, R_4, R_5$ = H, $CH_3$, $C_2H_5$, $OCH_3$, $OC_2H_5$, $OCH_2COOH$, COOH,
COOR, $OCH_2COOR$, $NO_2$, Cl, Br, CN (R = alkyl), $CO-N\begin{smallmatrix}B\\B_1\end{smallmatrix}$, $-O-(CH_2)_n-CO-N\begin{smallmatrix}B\\B_1\end{smallmatrix}$, $-SO_2-N\begin{smallmatrix}B\\B_1\end{smallmatrix}$, $-O-(CH_2)_n-SO_2-N\begin{smallmatrix}B_1\\B\end{smallmatrix}$, (n = 1 – 4)

$R_6$ = OH, $NH_2$

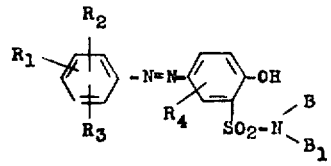

$R_1, R_2, R_3$ = H, $CH_3$, $C_2H_5$, $OCH_3$, $OC_2H_5$, Cl, Br, $OCH_2COR$,
$NO_2$, COOH, $OCH_2COOH$, COOR (R = alkyl), NH-acyl, $CO-N\begin{smallmatrix}B\\B_1\end{smallmatrix}$, $-O-CH_2-CO-N\begin{smallmatrix}B\\B_1\end{smallmatrix}$, $-SO_2-N\begin{smallmatrix}B\\B_1\end{smallmatrix}$, $-O-(CH_2)_n-SO_2-N\begin{smallmatrix}B\\B_1\end{smallmatrix}$ (n = 1 – 4)

$R_4$ = H, alkyl

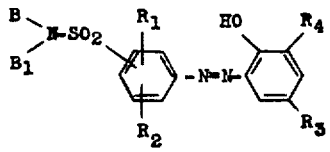

$R_1, R_2$ = H, $CH_3$, $C_2H_5$, $OCH_3$, $OC_2H_5$, Cl, Br, $NO_2$
$R_3$ = alkyl, cycloalkyl
$R_4$ = H, COOH, $CO-N\begin{smallmatrix}B\\B_1\end{smallmatrix}$, $-SO_2-N\begin{smallmatrix}B\\B_1\end{smallmatrix}$

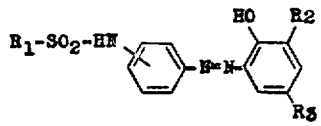

$R_1$ = alkyl, aryl, $N\begin{smallmatrix}B\\B_1\end{smallmatrix}$ $R_2$ = H, COOH, $CO-N\begin{smallmatrix}B\\B_1\end{smallmatrix}$, $-SO_2-N\begin{smallmatrix}B\\B_1\end{smallmatrix}$ $R_3$ = alkyl, cycloalkyl

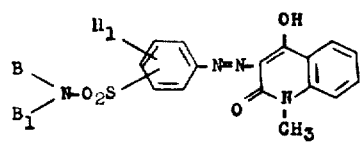

$R_1$ = H, $NO_2$, Cl

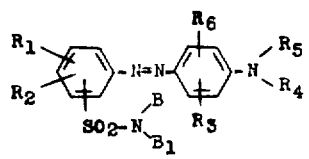

$R_1$, $R_2$ = H, $CH_3$, Cl, Br, $NO_2$, $OCH_3$, CN
$R_3$ = H, $CH_3$, $OCH_3$, $OC_2H_5$, $OC_6H_5$
$R_4$, $R_5$ = H, $CH_3$, $C_2H_5$, $CH_2CH_2OH$, $CH_2 \cdot CH_2 \cdot CN$,
$CH_2CH_2OR_7$ ($R_7$ = alkyl or acyl radical)
$R_6$ = H, NH·acyl, NH-$(CH_2)_n$-$SO_2$-N$\begin{smallmatrix}B\\B_1\end{smallmatrix}$ (n = 0 - 4)

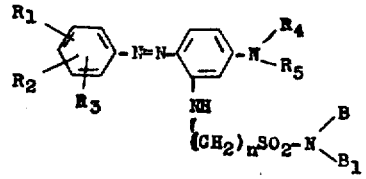

$R_1$, $R_2$, $R_3$ = H, $CH_3$, $C_2H_5$, $OCH_3$, $OC_2H_5$, $OCH_2COOH$, COOH,
$OCH_2COOR$, COCR, $NO_2$, Cl, Br, CN,

O-$CH_2$-CO-N$\begin{smallmatrix}B\\B_1\end{smallmatrix}$,  CO-N$\begin{smallmatrix}B\\B_1\end{smallmatrix}$, $R_4$, $R_5$ = $CH_3$, $C_2H_5$, $CH_2CH_2OH$, $CH_2 \cdot CH_2 \cdot CN$, $CH_2CH_2OR_6$
($R_6$ = alkyl or acyl radical)
n = 0, 1, 2, 3.

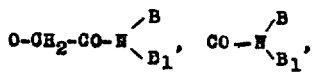

$R_1$, $R_2$ = H, $CH_3$, $C_2H_5$, $OCH_3$, $OC_2H_5$, $NO_2$, Cl, Br,
$R_4$, $R_5$ = $CH_3$, $C_2H_5$, $CH_2CH_2OH$.

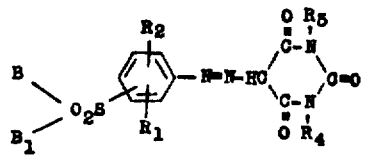

$R_1$, $R_2$ = H, $CH_3$, Cl, Br, $NO_2$, $OCH_3$,
$R_3$, $R_4$ = H, $CH_3$, $OCH_3$, $OC_2H_5$, NH·acyl
$R_5$, $R_6$ = H, $CH_3$, $C_2H_5$, $CH_2CH_2OH$, $CH_2CH_2OR_7$ ($R_7$ = acyl radical),
$R_7$ = -$SO_2$-alkyl, -$SO_2$-aryl, -$(CH_2)_n$-$SO_2$-N$\begin{smallmatrix}B\\B_1\end{smallmatrix}$ (n = 0 - 4)

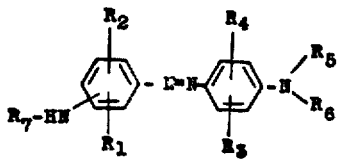

$R_1$, $R_2$, $R_3$ = H, $CH_3$, $C_2H_5$, $OCH_3$, $OC_2H_5$, Cl, Br, $NO_2$, COOH,

-CO-N$\begin{smallmatrix}B\\B_1\end{smallmatrix}$,  -$SO_2$-N$\begin{smallmatrix}B\\B_1\end{smallmatrix}$

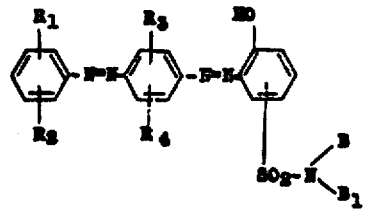

R, $R_2$ = H, OH, $OCH_3$, Cl, $NO_2$, $CH_3$ $R_3$, $R_4$ = H, $CH_3$, $OCH_3$, $C_2H_5$, $OC_2H_5$

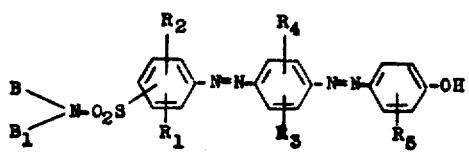

$R_1$, $R_2$ = H, OH, $OCH_3$, Cl, $NO_2$, $CH_3$, $R_3$, $R_4$ = H, $CH_3$, $C_2H_5$, $OCH_3$, $OC_2H_5$, $R_5$ = H, $CH_3$, $OCH_3$, COOH, $SO_2-N\begin{smallmatrix}B\\B_1\end{smallmatrix}$.

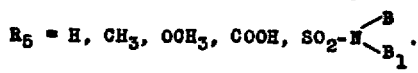

$R_1$, $R_2$, $R_3$ = H, $CH_3$, $C_2H_5$, Cl, Br, $OCH_2COOH$, $OCH_2COOR$,

COOH (R = alkyl), $OCH_2CO-N\begin{smallmatrix}B\\B_1\end{smallmatrix}$, $CO-N\begin{smallmatrix}B\\B_1\end{smallmatrix}$, $-SO_2-N\begin{smallmatrix}B\\B_1\end{smallmatrix}$ $R_4$, $R_5$ = H, $CH_3$, $C_2H_5$, $OCH_3$, $OC_2H_5$, n = 0, 1, 2, 3, 4.

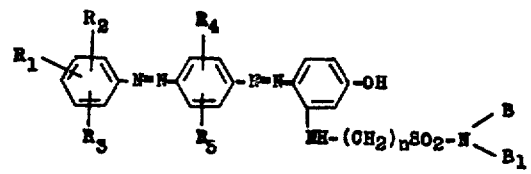

$R_1$, $R_2$, $R_3$, $R_4$, $R_5$ = H, $CH_3$, $C_2H_5$, $OCH_3$.

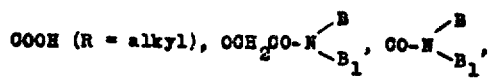

$R_1$, $R_2$, $R_3$, $R_4$ = H, $CH_3$, $C_2H_5$, $OCH_3$, Cl, $NO_2$, $-SO_2-N\begin{smallmatrix}B\\B_1\end{smallmatrix}$ $R_5$ = $CH_3$, COOH, COOalkyl, Oalkyl

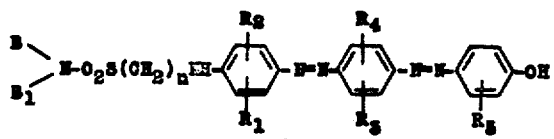

$R_1$, $R_2$ = H, Cl, $NO_2$

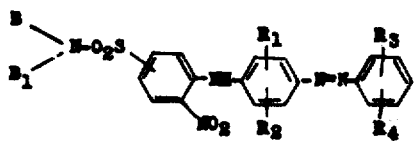

$R_1, R_2, R_3, R_4 = H, CH_3, C_2H_5, OCH_3$

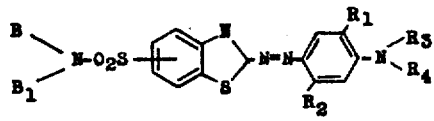

$R_1 = H, C_1-C_4$-alkyl, $C_1-C_4$-alkoxy, aryloxy $R_2 = H$, hal, $C_1-C_4$-alkyl, $C_1-C_4$-alkoxy, -NH-acyl $R_3, R_4 = H, CH_3, C_2H_5, CH_2.CH_2.OH, CH_2.CH_2.CH.O.acyl,$ $CH_2.CH_2.CN$

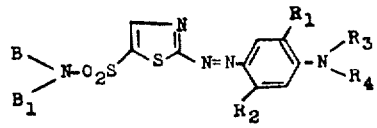

$R_1 = H, C_1-C_4$-alkyl, $C_1-C_4$-alkoxy, aryloxy $R_2 = H$, hal, $C_1-C_4$-alkyl, $C_1-C_4$-alkoxy, -NH-acyl $R_3, R_4 = H, CH_3, C_2H_5, CH_2.CH_2.OH, .CH_2.CH_2.O.acyl, .CH_2.CH_2.CN$

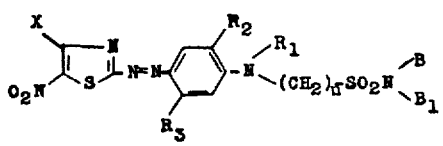

$X = H, CH_3, n-C_3H_7, n-C_4H_9$ $R_1 = CH_3, C_2H_5,$ sec. $C_4H_9, CH_2CH_2OH, CH_2CH_2OCOCH_3,$ $CH_2CH_2CN,$ $R_2 = H, C_1-C_4$-alkyl, $C_1-C_4$-alkoxy, $R_3 = H$, hal, $C_1-C_4$-alkyl, $C_1-C_4$-alkoxy, -NH-CO-R'

(R' = $C_1-C_6$-alkyl)

$n = 0 - 4$

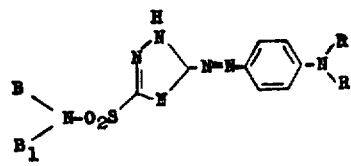

$R = CH_3, C_2H_5, C_4H_9.$

Suitable anthraquinone dyestuffs are, for example, those in which one or more sulphonamide groups stand in the anthraqunione molecule itself or in aryl or alkyl radicals which are linked to the anthraquinone molecule via bridge members such as amino, ether, thioether, sulphonamide or sulphonylamino groups.

The anthraquinone compounds may have the following constitutions, for example, the group

having the same meaning as above:

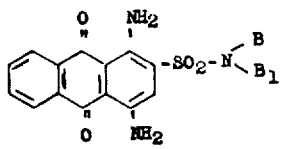

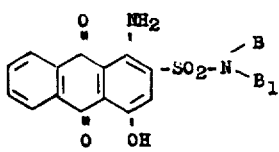

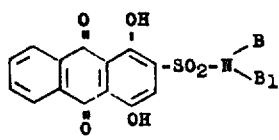

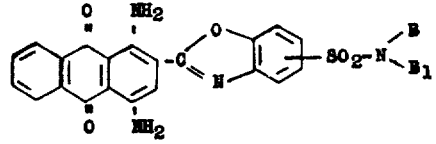

—Continued

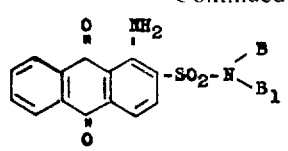

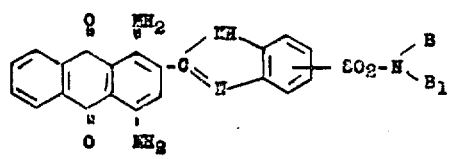

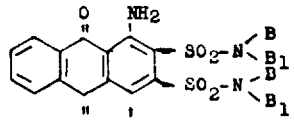

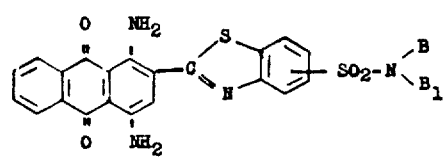

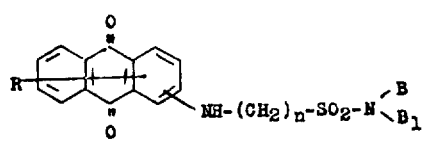

R = hal, OCH₃, OH    n = 1 – 4

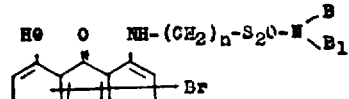

n = 1 – 4

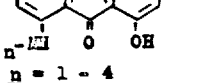

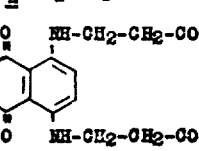

one X = OH, the other X = $D_g$, $NH_g$,

R = SO₂-N(B)(B₁),    -CH₂-SO₂-N(B)(B₁),

NH-SO₂-alkyl, NH-SO₂-aryl, 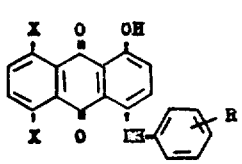    n = 3,4 furthermore, acylation products of aminoanthraquinones, e.g. of the formulae:

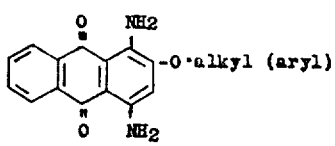

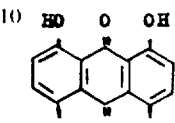  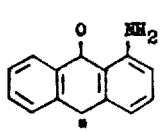

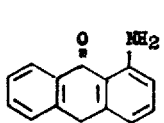  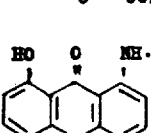

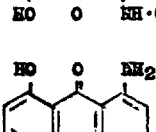  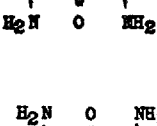

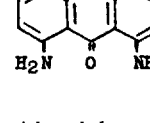  

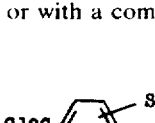  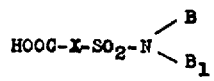

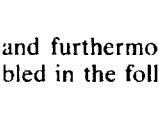

with sulpho-carboxylic acids of the general formula

HOOC-X-SO₂-N(B)(B₁)

X = alkylene, arylene, a bivalent heterocyclic radical, or with a compound of the formula

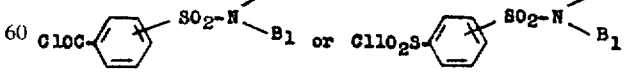

and furthermore, the anthraquinone dyestuffs assembled in the following Table:

| Structure | $-O-C_1-C_4$-alkylene-$SO_2-N\overset{B}{\underset{B_1}{}}$ | $-S-C_1-C_4$-alkylene-$SO_2-N\overset{B}{\underset{B_1}{}}$ | $-NH-C_1-C_4$-alkylene-$SO_2-N\overset{B}{\underset{B_1}{}}$ | $-O-\underset{}{\phantom{x}}\bigcirc\underset{}{\phantom{x}}-SO_2-N\overset{B}{\underset{B_1}{}}$ | $-S-\bigcirc-SO_2-N\overset{B}{\underset{B_1}{}}$ | $-NH-\bigcirc-SO_2-N\overset{B}{\underset{B_1}{}}$ | $-NH-\bigcirc-O-C_1-C_4$-alkylene-$SO_2-N\overset{B}{\underset{B_1}{}}$ | $-NH-\bigcirc-C_1-C_2$-alkylene-$SO_2-N\overset{B}{\underset{B_1}{}}$ | $-NH-\bigcirc-S-C_1-C_4$-alkylene-$SO_2-N\overset{B}{\underset{B_1}{}}$ |
|---|---|---|---|---|---|---|---|---|---|
| 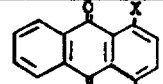 1,4-di-X anthraquinone | | | X | | | X | | | |
| 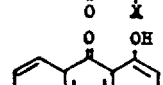 1-OH, 4-X | | X | X | | X | X | | | |
| 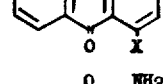 1-NH2, 4-X | | X | X | | X | X | X | | X |
| 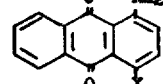 1,4-di-OH, 2/3-X | X | X | X | X | | | | | |
| 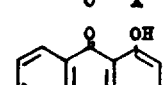 1-OH, 4-NH2, 2/3-X | X / X | X | | X | X | | | | |
| 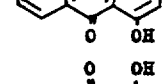 1,5-di-OH, 4-X, 8-NO2(NH2) | | X | X | | X | X | X | | X |
| 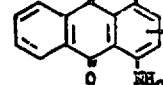 1-NO2, 4,5-di-OH, 8-NH2, X | X | X | | X | X | X | | | X |
| 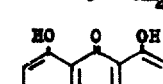 1,5-di-OH, 4,8-di-NH2, 2/3-X | X / X | | | X / X | X | X | | | |
| 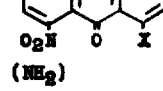 1-NH2, 4-OH, 5-OH, 8-NH2, 3/3-X | X / X | | | X / X | | | | | |

The anthraqunione dyestuffs of the formula

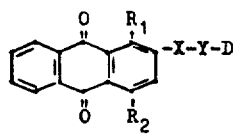

in which
R₁ means an amino group
R₂ means a hydroxy or amino group
X means —O— or —S—
Y means a phenylene group and
D means

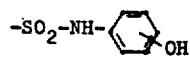

have proved to be of special interest and among them the dyestuffs

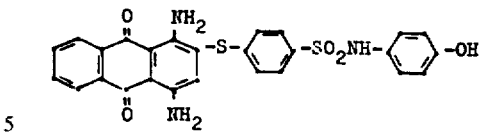

and

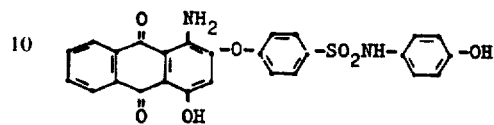

have proved to be especially valuable.

Among anthraquinone condensaton products which contain sulphonamide groups and contain more than thre fused rings, the following may be mentioned by way of example: Isothiazoloanthrones, such as

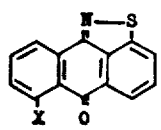 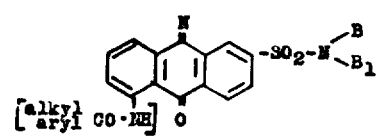

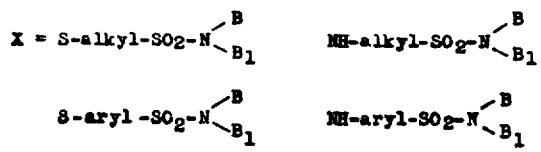

Pyrazoloanthrones, such as

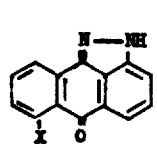 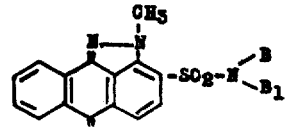

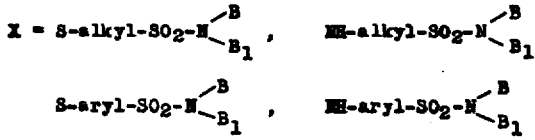

furthermore, dyestuffs of the type

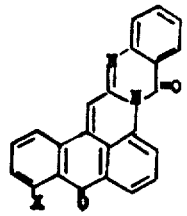 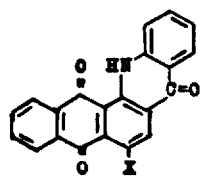

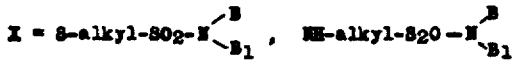

S-aryl-SO$_2$-N$\begin{smallmatrix}B\\B_1\end{smallmatrix}$,  NH-aryl-SO$_2$-N$\begin{smallmatrix}B\\B_1\end{smallmatrix}$

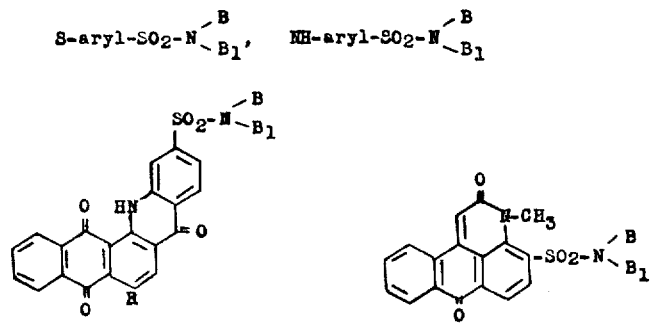

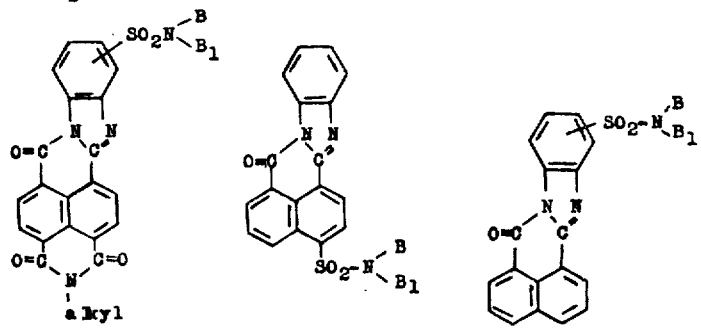

R = H, NH$_2$

Anthraquinone dyestuffs of the formulae given above are prepared according to the synthesis principles known in anthraquinone chemistry. Condensation reactions with appropriate starting compounds are suitable in the first instance for this purpose. For example, amino group-containing anthraquinone compounds in which the amino groups stand either in an external position or, preferably, in a position linked to the nucleus, can be condensed with suitable sulphoaryl-acid halides or anhydrides, e.g. sulphophenyl- or naphthyl-carboxylic acid or -sulphonic acid chlorides or bromides to form the corresponding acid amides; or, for example, anthraquinone compounds with mobile halogen atoms can be reacted with sulphoaryl-amines such as sulphophenyl-or sulphonaphthyl-amines to form the corresponding sulphoarylamino-anthraquinone derivatives, and the free sulpho groups still present in the resultant dyestuffs can be converted into sulphonamide groups in known manner. Alternatively, for example, anthraquinone compounds containing amino groups can be condensed with sulphonamido-aryl-acid halides or anhydrides, or e.g. anthraquinone compounds containing mobile halogen atoms can be condensed with sulphonamido-arylamines.

Anthraquinone ether and thioether derivatives in which sulphonamide groups are contained in alkyl, aralkyl or aryl radicals of the ether or thioether component, can be prepared according to similar synthesis principles. Another possibility of synthetising sulphonamide group-containing anthraquinone dyestuffs to be used according to the invention consists in that anthraquinone-acid halides, such as carboxylic acid and sulphonic acid chlorides or bromides, are converted into the corresponding amides or esters with the aid of suitable amino or hydroxy compounds which contain at least one additional sulphonamide group. Obviously, it is also possible to use for the present process also those anthraquinone compounds in which one or more sulphonamide groups stand in a position linked to the nucleus or in which sulphonamide groups linked to the nucleus as well as externally linked sulphonamide groups are present.

As representatives of nitro dyestuffs containing sulphonamide groups, there may be mentioned for example dyestuffs of the formula

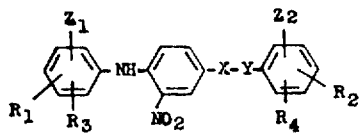

X = —SO$_2$— or —CO—
Y = —NH— or —O—
Z$_1$ and/or Z$_2$ =

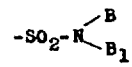

R$_1$, R$_2$ = H, Cl, Br, F, CH$_3$, C$_2$H$_5$, CH$_3$O, OH, CN, NO$_2$,

R$_3$, R$_4$ = CF$_3$, COOH, O—CH$_2$—COOH, —O—CH$_2$—COOH, —COOalkyl, —NH—acyl, CO-N$\begin{smallmatrix}B\\B_1\end{smallmatrix}$, O-CH$_2$-CO-N$\begin{smallmatrix}B\\B_1\end{smallmatrix}$, -O-CH$_2$-CH$_2$-CO-N$\begin{smallmatrix}B\\B_1\end{smallmatrix}$, CH$_2$OH, CH$_2$-CH$_2$-OH, -NH-(CH$_2$)$_n$-SO$_2$-N$\begin{smallmatrix}B\\B_1\end{smallmatrix}$ or dyestuffs of the formula

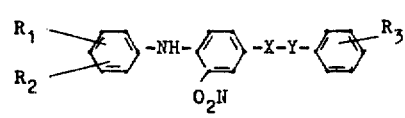

in which
R$_1$ means hydrogen, a halogen atom, a trifluoro, cyano, hydroxy, C$_1$-C$_4$-alkyl or -alkoxy, a hydroexmethyl or -ethyl, a hydroxy-ethylene-oxy, acylamino, alkylsulphonyl-amino, alkylsulphone, carboxamide, aminosulphonyl-alkyleneamino or sulphonamide group;

$R_2$ means hydrogen or a $C_1$–$C_4$ alkoxy group;

$R_3$ means hydrogen, a halogen atom, a hydroxy, hydroxy-ethyleneoxy, carboxamide, aminosulphenyl-alkylensoxy or sulphonamide group;

X stands for the group —$SO_2$— or —CO; and

Y stands for —NH— or —O—;

with the proviso that one of the radicals $R_1$, $R_3$ or

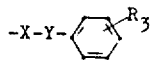

is a sulphonamide group or a radical containing a sulphonamide group.

The nitro dystuff of the formula

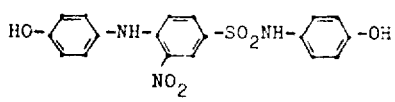

has proved to be especially valuable.

In many cases it has proved advantageous for the dyebaths to contain small amounts of water, i.e. up to 1 per cent by weight, preferably 0.5 per cent by weight, referred to the weight of the organic solvent.

Furthermore, it has proved expedient in some cases to add non-ionic auxiliaries to the dyebaths. Suitable nonionic auxiliaries are primarily the known interface-active ethoxylation and propoxylation products of fatty alcohols, alkylphenols, fatty acid amides and fatty acids as well as mixtures thereof; the auxiliaries are used in an amount of 0.05 – 2 per cent by weight, referred to the weight of the organic solvents. Instead of being immediately added to the dyebaths, the auxiliaries can also be used to advantage for pasting the sulphonamide group-containing dyestuffs and in this way be added to the dyebaths in the form of a dyestuff/auxiliary paste.

The synthetic fibre materials to be dyed according to the invention are primarily fibre materials of polyesters, such as polyethylene terephthalate, polycyclohexanedimethylene terephthalate, heterogeneous polyesters from terephthalic acid, sulphoisphthalic acid and ethylene glycol, or copolyester ester fibres from p-hydroxybenzoic acid, terephthalic acid and ethylene glycol; cellulose triacetate, cellulose 2 ½-acetate; polyarcylonitrile; synthetic polyamides such as hexamethylene-diamine adipate, poly-ε-caprolactam or 4-aminoundecanic acid; and polyurethanes. The fibre materials may be present in the most varied stages of processing, for example, as threads, loose material, combed material, yarn, as piece goods such as fabrics or knitted fabrics, or as ready-made goods.

Dyeing according to the invention is preferably carried out in closed apparatus, for example, by introducing the fibre materials at room temperature into the dyebath, heating the dyebath to 60°–170°C and keeping it at this temperature until the bath is exhausted; this is usually the case after 10 – 60 minutes. After cooling to room temperature, the liquor is separated and the fibre materials are freed from any adhering solvent, optionally after a short rinsing with fresh organic solvent, by filtering with suction or by centrifuging and subsequent drying in a warm current of air. With the aid of the process according to the invention it is possible to dye synthetic fibre materials from organic solvents in a simple way, high dyestuff yields and excellent fastness properties being achieved.

The sulphonamide group-containing dyestuffs to be used according to the invention are largely insoluble in the organic water-immiscible solvents. They are distinguished from the dyestuffs hitherto used for dyeing synthetic fibre materials from organic solvents by their substantially better affinity and an increased fastness to sublimation.

It may be mentioned that mixtures of the dyestuffs to be used according to the invention sometimes gives a better dyestuff yield than the individual dyestuffs. The parts given in the following Examples are parts by weight.

EXAMPLE 1

100 Parts of a fabric of textured polyethylene terephthalate fibres are introduced at room temperature, without previous cleaning, into a dyebath prepared from 1 part of the monoazo dyestuff 4-aminobenzene-sulphonic acid amide → 3-methyl-pyrazolone-(5) and 1000 parts tetrachloroethylene.

The bath is heated to 115°C within 10 minutes and kept at the same temperature for 30 minutes, while the liquor is vividly circulating. The liquor is then separated and the dyed material is rinsed with fresh solvent at about 40°C for 5 minutes. After separating of the rinsing liquor, the dyed material is centrifuged and dried in an air current. A strong yellow dyeing of excellent fastness to sublimation and very good fastness to washing and light is obtained.

An equally satisfactory yellow dyeing was obtained in the same way on a fabric of polycyclohexane-dimethylene terephthalate fibres.

Yellow dyeings of equally satisfactory fastness properties were also obtained when the dyestuff mentioned above was replaced with the same amount of one of the following monoazo dyestuffs:

| Example | Dyestuff | Shade |
|---|---|---|
| 2 | 3-nitro-4-amino-benzene-sulphonic acid amide → 3-methyl-pyrazolone-(5) | yellow |
| 3 | 2-amino-benzene-sulphonic acid amide → 3-methyl-pyrazolone-(5) | yellow |
| 4 | 2,5-dimethoxy-aniline → 3-methyl-5-pyrazolone-1-sulphonic acid amide | yellow |
| 5 | 2-nitro-aniline → 3-methyl-5-pyrazolone-1-sulphonic acid methylamide | yellow |
| 6 | 4-methoxy-3-amino-benzene-sulphonic acid n-butylamide → 1-phenyl-3-methyl-5-pyrazolone | yellow |
| 7 | 3-nitro-4-amino-benzene-sulphonic acid amide → 1-phenyl-3-methoxy-5-amino-pyrazole | orange |
| 8 | 2-nitro-4-chloro-aniline → 1-(3-morpholino-sulphonyl-phenyl)-3-ethoxy-5-amino-pyrazole | orange |
| 9 | 4-amino-benzene-sulphonic acid amide → 1-phenyl-5-pyrazolone-3-carboxylic acid ethyl ester | yellow |
| 10 | 4-amino-benzene-sulphonic acid amide → 1-(3-carboxyphenyl)-methyl-5-pyrazolone | yellow |
| 11 | 4-amino-benzene-sulphonic acid ethylamide → 1-phenyl-5-pyrazolone-3-carboxylic acid | yellow |
| 12 | 4-amino-benzene-sulphonic acid dimethyl-amide → 1-phenyl-5-pyrazolone-3-carboxylic acid amide | yellow |

—Continued

| Example | Dyestuff | Shade |
|---|---|---|
| 13 | 3-nitro-4-amino-benzene-sulphonic acid amide → 1-phenyl-5-pyrazolone-3-carboxylic acid ethyl ester | yellow |
| 14 | 2-methoxy-4-nitro-aniline → 1-(3-amino-sulphonyl-phenyl)-3-methyl-5-pyrazolone | yellow |
| 15 | 4-amino-benzene-sulphonic acid-(di-2-hydroxyethyl)-amide → 1-(2-cyanoethyl)-3-methyl-5-pyrazolone | yellow |
| 16 | 4-amino-benzene-sulphonic acid ethylamide → 1-(2-carboxyethyl)-3-methyl-5-pyrazolone | yellow |
| 17 | 2-cyano-4-nitro-aniline → 1-(3-amino-sulphonyl-phenyl)-3-methyl-5-pyrazolone | yellow |
| 18 | 4-methyl-anilino → 1-(3-phenylamino-sulphonyl-phenyl)-3-methyl-5-pyrazolone | yellow |
| 19 | 4-amino-benzene-sulphonic acid-dimethyl-amide → 1-(3-aminosulphonyl-phenyl)-3-methyl-5-pyrazolone | yellow |
| 20 | 3-nitro-4-amino-benzene-sulphonic acid dimethylamide → 1-(3-chlorophenyl)-5-pyrazolone-3-carboxylic acid | yellow |
| 21 | 2-methoxy-5-nitro-aniline → 1-(2-amino-sulphenyl-ethyl)-3-methyl-5-pyrazolone | yellow |
| 22 | 2-bromo-4-nitro-aniline → 1-hydroxy-benzene-2-sulphonic acid-(di-2-cyanoethyl)-amide | yellow |
| 23 | 4-ethoxy-aniline → 1-hydroxy-3-methyl-benzene-2-sulphonic acid-(4-chlorophenyl)-amide | yellow |
| 24 | 4-(4-pyrrolidinesulphonylbutoxy)-aniline → 1-hydroxy-benzene-2-sulphonic acid (2-pyridino)-amide | yellow |
| 25 | 3-amino-benzoic acid → 1-hydroxy-benzene-2-sulphonic acid-(3-sulpholanyl)-amide | yellow |
| 26 | 4-amino-benzene-sulphonic acid amide → 1-hydroxy-4-methyl-benzene | yellow |
| 27 | 2-amino-benzene-sulphonic acid amide → 1-hydroxy-4-methyl-cyclohexyl-benzene | yellow |
| 28 | 3-nitro-4-amino-benzene-sulphonic acid amide → 1-hydroxy-4-methyl-benzene | yellow |
| 29 | 3-nitro-5-chloro-4-amino-benzene-sulphonic acid → 1-hydroxy-4-methyl-benzene | yellow |
| 30 | 4-amino-benzene-sulphonic acid-piperidide → 1-hydroxy-4-methyl-benzene-2-carboxylic acid | yellow |
| 31 | 4-amino-benzene-sulphonic acid-(2-methyl-sulphonylethyl)-amide → 1-hydroxy-4-methyl-benzene-2-sulphonic acid amide | yellow |
| 32 | 4-methylsulpenylamino-aniline → 1-hydroxy-4-n-propyl-benzene | yellow |
| 33 | 4-phenylsulphenylamino-aniline → 1-hydroxy-4-methyl-benzene | yellow |
| 34 | 4-dimethylamino-sulphonylamino-aniline → 1-hydroxy-4-ethyl-benzene | yellow |
| 35 | 4-methylsulphonylamine-aniline → 1-hydroxy-4-methyl-benzene-2-carboxylic acid amido | yellow |

EXAMPLE 36

100 Parts of a fabric of triacetate fibres are introduced at room temperature into a dyebath prepared from 1 part of the monoazo dyestuff 4-methyl-sulphonylamino-aniline → 1-hydroxy-4-methyl-benzene and
1000 parts tetrachloroethylene.

The bath is heated to 110°C within 20 minutes and kept at the same temperature for 45 minutes while the liquor is vividly circulating. The liquor is then separated and the fabric is rinsed with fresh tetrachloroethylene at 40°C. After separation of the rinsing liquor, the dyed materials is freed from the adhering solvent by centrifuging and drying in an air current. A full brilliant yellow dyeing of excellent fastness properties is obtained.

EXAMPLE 37

100 Parts of yarn of acetate threads are introduced at about 22°C into a dyebath prepared from 1 part of the monoazo dyestuff 4-piperidyll-sulphonylamino-aniline → 1-hydroxy-4-methylbenzene,
1000 parts tetrachloroethylene 1.5 parts oleic acid ethanolamide
1.5 parts oeyl alcohol eicosaethylene glycol ether and
6 parts of water.

The bath is heated to 78°C within 20 minutes and kept at the same temperature for 45 minutes. After separation of the dye liquor and rinsing with fresh tetrachloroethylene, the dyed material is freed from the adhering solvent by filtering with suction and drying in an air current. A brilliant yellow dyeing is obtained.

EXAMPLE 38

100 Parts of yarn of polyacrylonitrile fibres are dyed in a dyebath prepared as described in Example 36. The bath is heated to 100°C within 20 minutes and kept at the same temperature for 30 minutes. After the usual washing and drying, there is obtained a yellow dyeing of good fastness properties.

EXAMPLE 39

100 Parts of a fabric of polyethylene terephthalate fibres are heated in a dyebath containing 1 part of the monoazo dyestuff 3-nitro-4-aminobenzene-sulphonic acid amide → 1-methyl2,4-dihydroxy-quinoline in
1000 parts tetrachloroethylene to 115°C within 10 minutes and dyed at the same temperature for 30 minutes. After separation of the liquor, rinsing and drying, there is obtained a brillaint greenish yellow dyeing of very good fastness to sublimation, washing and light.

When the above dyestuff was replaced with the same amount of one of the dyestuffs listed in the following Table, dyeings of equally satisfactory fastness properties were obtained in the shades stated in the Table:

| Example | Dyestuff | Shade |
|---|---|---|
| 40 | 4-amino-benzene-sulphonic acid amide → 1-methyl-2,4-dihydroxy-quinoline | yellow |
| 41 | 4-trifluoromethyl-2-amino-benzene-sulphonic acid amide → 1-methyl-2,4-dihydroxy-quinoline | yellow |
| 42 | 4-chloro-3-amino-benzene-sulphonic acid (2-hydroxyethyl)amide → 1-methyl-2,4-dihydroxy-quinoline | yellow |
| 43 | 4-amino-benzene-sulphonic acid-(di-2-hydroxyethyl)-amide → 1-methyl-2,4-dihydroxy-quinoline | yellow |
| 44 | 3-amino-benzene-sulphonic acid-(2-methyl-thioethyl)-amide → 1-methyl-2,4-dihydroxy-quinoline | yellow |
| 45 | 4-amino-benzene-sulphonic acid-(1-naphthyl)-amide → 1-methyl-2,4-dihydroxy-quinoline | yellow |
| 46 | 3,5-dichloro-4-amino-benzene-sulphonic acid dimethyl-amide → N-(2-cyanoethyl)-N-ethyl-aniline | yellow |
| 47 | 3,6-dichloro-4-amino-benzene-sulphonic acid dimethyl-amide → N-(2-cyanoethyl)-N-ethyl-aniline | orange |
| 48 | 3-nitro-4-amino-benzene-sulphonic acid amide → N,N-(di-2-acetoxyethyl)-aniline | reddish yellow |
| 49 | 3-nitro-5-bromo-4-amino-benzene-sulphonic acid amide → N,N-(di-2-acetoxyethyl)-aniline | yellowish red |
| 50 | 3-nitro-4-amino-benzene-sulphonic acid amide → 3-methyl-N,N-(di-2-acetoxy-ethyl)-aniline | reddish yellow |
| 51 | 3-cyano-5-nitro-4-amino-benzene-sulphonic acid methylamine → N-ethyl-N-(2-acetoxyethyl)-aniline | yellowish red |
| 52 | 3,5-dicyano-4-amino-benzene-sulphonic acid amide → N,N-dimethyl-aniline | red |

| Example | Dyestuff | Shade |
|---|---|---|
| 53 | 3-chloro-5-nitro-2-amino-benzene-sulphonic acid amide → N,N-(di-2-propionyloxyethyl)-aniline | red |
| 54 | 3-chloro-5-nitro-2-amino-benzene-sulphonic acid → N,N-(di-2-methoxycarbonylethyl)-aniline | red |
| 55 | 3-cyano-5-nitro-2-amino-benzene-sulphonic acid amide → 3-methyl-N,N-(di-2-methoxycarbonyloxy-ethyl)-aniline | bluish red |
| 56 | 3,5-dichloro-4-amino-benzene-sulphonic acid methylamide → N-(2-pyrrolidylcarbonyl-ethyl)-aniline | orange |
| 57 | 3-cyano-5-bromo-4-amino-benzene-sulphonic acid diethylamide → N-[2-(3-methyl-phenylamino)-ethyl]-succinimide | reddish orange |
| 58 | 5-methoxy-2-amino-benzene-sulphonic acid amide → N-(2-cyanoethyl)-N-(2-hydroxyethyl)-aniline | yellowish red |
| 59 | 3-bromo-5-nitro-4-amino-benzene-sulphonic acid amide → 3-acetylamino-N,N-dimethyl aniline | violet |
| 60 | 3-bromo-5-cyano-4-amino-benzene-sulphonic acid amide → 3-acetylamino-N,N-diethyl-aniline | red-violet |
| 61 | 3,5-dicyano-4-amino-benzene-sulphonic acid amide → 3-acetylamino-N,N-dimethylaniline | violet |
| 62 | 3-bromo-5-nitro-4-amino-benzene-sulphonic acid amide → 2-methoxy-5-acetylamino-N,N-dimethyl-aniline | violet |
| 63 | 3-chloro-5-nitro-2-amino-benzene-sulphonic acid amide → 2-phenoxy-5-acetylamino-N,N-dimethyl-aniline | violet |
| 64 | 2-bromo-4,6-dinitro-aniline → 3-methyl-sulphonylamino-N,N-dimethylaniline | violet |
| 65 | 2-bromo-4-nitro-6-cyano-aniline → 3-chloromethylsulphonylamino-N-(2-cyanoethyl)-aniline | blue-violet |
| 66 | 2,6-dicyano-4-nitro-aniline → 3-methylsulphonylamino-N,N-dimethyl-aniline | blue |
| 67 | 2-bromo-4,6-dinitro-aniline → 3-phenyl-sulphonylamino-N,N-dimethyl-aniline | violet |
| 68 | 2-chloro-4,6-dinitro-aniline → 3-methylsulphonylamino-N-(2-hydroxyethyl)-N-(2-cyanoethyl)-aniline | violet |
| 69 | 2-bromo-4,6-dinitro-aniline → 2-methoxy-5-methylsulphonylamino-N,N-(di-2-acetoxyethyl)-aniline | blue |
| 70 | 2,6-dichloro-aniline → 3-dimethyl-sulphonyl-amino-N,N-(di-2-acetoxy-ethyl)-aniline | reddish yellow |
| 71 | 3-bromo-5-nitro-4-amino-benzene-sulphonic acid amide → 3-methylamino-sulphonylmethylamino-N,N-dimethyl-aniline | brown |
| 72 | 2-chloro-4-nitro-6-cyano-aniline → 3-(3-ethylaminosulphonylpropylamino)-N,N-diethyl-aniline | brown |
| 73 | 2,6-dichloro-4-nitro-aniline → N-ethyl-N-(2-dimethylaminosulphonyl-ethyl)-aniline | yellow-brown |
| 74 | 4-dimethylsulphonylamino-aniline → 3-methyl-N,N-(di-2-acetoxyethyl)-aniline | reddish yellow |
| 75 | 3-nitro-5-amino-benzene-sulphonic acid (2-hydroxyethyl)-amide → N-(2-methoxy-ethyl)-N-(2-methoxycarbonylethyl)-aniline | orange |
| 76 | 2-bromo-4,6-dinitro-aniline → N-methyl-sulphonyl-aniline | yellow |
| 77 | 2,5-dichloro-aniline → 3-methyl-N-ethyl-N-(2-methylsulphonylamino-ethyl)-aniline | reddish yellow |
| 78 | 4-amino-benzene-sulphonic acid methyl-amide → N-phenylaniline | yellow |
| 79 | 4-amino-benzene-sulphonic acid-thio-morpholid-S-dioxide | yellow |
| 80 | 4-(3-methylaminosulphonyl-benzoyl-amino)-aniline → 4-methyl-phenol | yellow |
| 81 | 6-methylaminosulphonyl-2-amino-1,3-benzothiazole → N-(2-cyanoethyl)-N-(2-acetoxyethyl)-aniline | red |
| 82 | 6-aminosulphonyl-2-amino-1,3-benzo-thiazole → N,N-(di-2-cyanoethyl)-aniline | red |
| 83 | 3-chloro-4-amino-benzene-sulphonic acid amide → 3-acetylamino-N,N-diethyl-aniline | orange |
| 84 | 5-methylaminosulphonyl-2-amino-1,3-thiazole → N-ethyl-N-(2-carboxy-ethyl)-aniline | bluish red |
| 85 | 5-aminosulphonyl-2-amino-1,3-thiazole → 3-acetylamino-N,N-dimethyl-aniline | red-violet |
| 86 | 4-(4-aminosulphonylphenyl)-2-amino-1,3,5-thiadiazole → N,N-di-2-acetoxy-ethyl)-aniline | yellowish red |
| 87 | 4-(4-methylaminosulphonylphenyl)-2-amino-1,3,5-thiadiazole → 3-acetyl-amino-N,N-dimethyl-aniline → | red |
| 88 | 4-methylsulphonylamino-aniline 3-methyl-N,N-(di-2-acetoxyethyl)-aniline | orange |
| 89 | 4-phenylsulphonylamino-2-chloro-aniline → 3-acetylamino-aniline | reddish orange |
| 90 | 2-chloro-4-nitro-aniline → 2-amino-naphthalene-6-sulphonic acid methylamide | orange red |
| 91 | 2-chloro-4-nitro-aniline → 2-amino-naphthalene-6-sulphonic acid amide | red |
| 92 | 4-methylsulphonylamino-2-nitro-aniline → 2-hydroxynaphthalene | red |
| 93 | 4-methylsulphonylamino-aniline → 2-aminonaphthalene-5-sulphonic acid methylamide | red |
| 94 | 4-amino-benzene-sulphonic acid amide → 1,2-dimethyl-indole | yellow |
| 95 | 4-aminoazobenzene → 2-hydroxy-naphthalene-6-sulphonic acid-N-methyl-N-(2-hydroxyethyl)-amide | red |
| 96 | 4-aminoazobenzene → 2-hydroxy-naphthalene-6-sulphonic acid N-methyl-N-(2-acetoxyethyl)-amide | red |
| 97 | 4-amino-azobenzene-4'-sulphonic acid amide → 2-hydroxynaphthalene | red |
| 98 | 3-chloro-5-amino-benzene-sulphonic acid amide → N,N-(di-acetoxyethyl)-aniline | reddish yellow |
| 99 | 4-methyl-5-aminosulphonyl-2-amino-1,3-thiazole → 3-acetylamino-N,N-dimethyl-aniline | red |
| 100 | 5-nitro-3-amino-benzoisothiazole-(2,1) → 3-methylsulphonylamino-N,N-dimethyl-aniline | navy |
| 101 | 5-nitro-3-amino-benzoisothiazole-(2,1)-6-sulphonic acid amide → 3-acetylamino-N,N-dimethyl-aniline | red |

EXAMPLE 102

100 Parts of a knitted fabric of polyethylene terephthalate fibres are dyed in a dyebath containing 1 part of the disazo dyestuff 4-aminobenzene-sulphonic acid amide → aniline → phenol in
1000 parts tetrachlorethylene at 115°C for 30 minutes. After the usual rinsing and drying, there is obtained a reddish yellow dyeing of very good fastness to sublimation, washing and light.

Dyeings of equally valuable fastness properties were also obtained when the above dyestuff was replaced with the same amount of one of the following disazo dyestuffs:

| Example | Dyestuff | Shade |
|---|---|---|
| 103 | 4-amino-benzene-sulphonic acid methyl-amide → 2,5-dimethoxy-aniline → phenol | reddish orange |
| 104 | 3-chloro-4-amino-benzene-sulphonic acid (4-chlorophenyl)-amide → 2-chloro-aniline → phenol | orange |
| 105 | 3-amino-toluene → 3-ethoxy-aniline → 1-hydroxy-benzene-2-sulphonic acid-(2-hydroxyethyl)-amide | orange |
| 106 | 4-chloro-3-amino-benzene-sulphonic acid amide → 3-amino-toluene → salicylic acid | reddish yellow |
| 107 | 3-nitro-4-amino-benzene-sulphonic acid amide → 3-amino-ethylbenzene → phenol | reddish yellow |
| 108 | 2-amino-benzene-sulphonic acid amide → aniline → salicylic acid amide | reddish yellow |
| 109 | 4-amino-toluene → 3-amino-benzene-sulphonic acid amide → phenol | yellow |
| 110 | 2,5-dichloro-aniline → aniline → 3-hydroxy-N-(4-aminosulphonylbutyl)-aniline | orange-brown |
| 111 | 4-methylsulphonylamino-aniline → 3-amino-toluene → phenol | reddish yellow |
| 112 | 4-(3-methylaminosulphonylpropylamino)-aniline → 3-methoxy-aniline → phenol | yellow reddish |
| 113 | 4-(4-methoxyphenylsulphonylamino)-aniline → 3-amino-ethylbenzene → phenol | reddish yellow |
| 114 | 4-amino-benzene-sulphonic acid amide 1-aminonaphthalene → phenol | orange |

| Example | Dyestuff — Continued | Shade |
|---|---|---|
| 115 | 3-nitro-4-amino-benzene-sulphonic acid amide → 1-amino-naphthalene → phenol | orange |
| 116 | aniline → 1-amino-naphthalene → 1-hydroxy-benzene-2-sulphonic acid amide | orange |
| 117 | 3-amino-benzene-sulphonic acid (2-cyano-ethyl)-amide → aniline | reddish yellow |
| 118 | 4-amino-benzene-sulphonic acid amide → 2-chloro-aniline → 4-tert.butyl-phenol | reddish yellow |
| 119 | 4-amino-benzene-sulphonic acid amide aniline → 4-hydroxy-toluene | reddish yellow |
| 120 | 4-amino-benzene-sulphonic acid amide → 3-amino-toluene → 4-hydroxy-toluene | reddish yellow |
| 121 | aniline → 1-amino-naphthalene-6-sulphonic acid amide → phenol | yellow orange |

EXAMPLE 122

50 Parts of a fabric of polyester fibres are introduced at room temperature into a dyebath prepared from 1 part 1-amino-4-hydroxy-2-(4-aminosulphonylphenyl-thio-anthraquinone
1.5 parts oleic acid ethanolamide
1.5 parts oleyl alcohol eicosaethylene glycol ether
6 parts of water and
500 parts tetrachloroethylene.

The bath is heated to 120°C within 10 minutes and kept at the same temperature for 45 minutes while the liquor is vividly circulating. After separation of the dye liquor, the dyed material is rinsed with fresh solvent at 40°C and, after removal of the rinsing liquor, dried in an air current. A brilliant violet dyeing of excellent fastness to light and sublimation is obtained.

Equally satisfactory violet dyeings are obtained when the 500 parts tetrachlorethylene are replaced with the same amount of 1,1,2-trichloroethane, 1,1,1,2-tetrachloroethane, 1,1,2,2,-tetrachlorethane, pentachloroethane, 1,2-dichloropropane, 2-chlorobutane, 1,4-dichlorobuutane, perfluoro-n-benzane, 1,2,2-trifluoro-trichlorethane, trifluoro-pentachloropropane, chlorobenzene, fluorobenzene, chlorotoluene or benzotrifluoride.

The dyestuff used in Example 122 had been prepared as follows: 15 parts 1-amino-4-hydroxy-2-phenylthioanthraquinone are dissolved in 76 parts chlorosulphonic acid, and 22.5 parts thionyl chloride are added at 20°-25°C within 1 hour. The melt is stirred at 20°-25°c for 3 hours, turned out on to ice, the precipitate is filtered off with suction and washed with ice-water until neutral. The product is subsequently introduced into 250 parts of 25% ammonia and stirred at 20°-25°C for 5 hours. It is filtered off with suction, washed with water, and after drying there are obtained 18.5 parts 1-amino-4-hydroxy-2-(4-aminosulphonylphenylthio)-anthraquinone = 96 percent of theory.

EXAMPLE 123

100 Parts of fibre yarn of poly-E-caprolactam are introduced at room temperature into a dyebath containing 1 part of the dyestuff mentioned in Example 122 in 1000 parts tetrachlorethylene.

The bath is heated to 100°C within 20 minutes and kept at the same temperature for 40 minutes while the liquor is vividly circulating. After this period of time, the liquor is separated, the dyeing is briefly rinsed with fresh solvent and dried in an air current after centrifuging. A brilliant violet dyeing of good fastness properties is obtained.

An equally satisfactory dyeing was also obtained on yarns of polyhexamethylene-diamine adipate fibres.

The strength of colour of the dyeing can be increased by ~ 10 percent by the addition of 1 part oleic acid ethanolamide
1 part oleyl alcohol eiscosaethylene glycol ether and
4 parts of water to the dyebath.

EXAMPLE 124

100 Parts polyethylene terephthalate fabric are dyed at 115°C for 30 minutes in a dyebath consisting of 1 part 1-amino-4-hydroxy-2-(4-methylaminosulphonylphenoxy)-anthraquinone,
3 parts oleic acid ethanoloamide
3 parts oleyl alcohol eicosaethylene glycol ether
12 parts of water and
160 parts tetrachlorethylene.

After rinsing with fresh tetrachlorcethylene and drying, there is obtained a strong and brilliant red dyeing of very good fastness to sublimation, washing and light.

When the above dyestuff was replaced with the same amount of one of the dyestuff listed in the following Table, then dyeings of equally satisfactory fastness properties were obtained in the shades stated in the Table:

| Example | Dyestuff | Shade |
|---|---|---|
| 125 | 1-amino-4-hydroxy-2-[4-(2-methoxyethyl-amino)-sulphonyl-phenoxy]-anthraquinone | red |
| 126 | 1-amino-4-hydroxy-2-[4-(2-hydroxyethyl-amino)-sulphonyl-phenoxy]-anthraquinone | red |
| 127 | 1-amino-4-hydroxy-6-chloro-2-(4-amino-sulphonyl-phenoxy)-anthraquinone | red |
| 128 | 1-amino-4-hydroxy-6,7-difluoro-2-(4-thiomorpholino-sulphonyl-phenoxy)-anthraquinone | red |
| 129 | 1-amino-4-hydroxy-2-(4-methylsulphonyl-aminophenoxy)-anthraquinone | red |
| 130 | 1-amino-4-hydroxy-2-[2-(4-aminosulphonyl-phenoxy)-ethoxy]-anthraquinone | red |
| 131 | 1-amino-4-hydroxy-2-[2-(4-methylamino-sulphonylphenyl)-ethoxy]-anthraquinone | red |
| 132 | 1-amino-4-hydroxy-2-[4-aminosulphonyl phenylthio)-ethoxy-]anthraquinone | red |
| 133 | 1-amino-4-hydroxy-2-(4-diethylamino-sulphonylamino-phenoxy)-anthraquinone | red |
| 134 | 1-amino-4-hydroxy-2-[4-(3-methoxy-propylamino)-sulphonyl-phenyl-thio]-anthraquinone | violet |
| 135 | 1-amino-4-hydroxy-2-[4-(2-hydroxy-ethylamino)-sulphonyl-phenyl-thio]-anthraquinone | violet |
| 136 | jamino-4-hydroxy-2-[4-chloro-2-(di-2-hydroxyethyl)-amino-sulphonyl-phenyl-thio]-anthraquinone | violet |
| 137 | jamino-4-hydroxy-2-(mmethylthio-3-amino-sulphonyl-phenyl-thio)-anthraquinone | violet |
| 138 | 1-amino-4-hydroxy-7-chloro-2-[(2-methyl-sulphonylethyl)-amino-sulphonyl-phenyl-thio]-anthraquinone | violet |
| 139 | 1-amino-4-hydroxy-2-(3-aminosulphonyl-propylthio)-anthraquinone | bluish red |
| 140 | 1-amino-4-hydroxy-2-(4-methylamino-sulphonyl-benzylthio)-anthraquinone | bluish red |
| 141 | 1-amino-4-hydroxy-2-[2-(4-hexamethylene-imino-sulphonyl-phenyl)-ethylthio]-anthraquinone | bluish red |
| 142 | 1-amino-4-hydroxy-2-[2-(3-methyl-4-aminosulphonyl-phenoxy)-ethyl-thio]-anthraquinone | bluish red |

| Example | Dyestuff | Shade |
|---|---|---|
| 143 | 1-amino-4-hydroxy-2-(2-dimethylamino-sulphonylethylthio)-anthraquinone | bluish red |
| 144 | 1-amino-4-methoxy-2-(4-methylamino-sulphonyl-phenoxy)-anthraquinone | yellow-red |
| 145 | 1-amino-4-methoxy-2-(4-N-methyl-N-phenylamino-sulphonyl-phenyl-thio)-anthraquinone | red |
| 146 | 1-amino-2-(4-morpholinosulphonyl-phenoxy)-anthraquinone | orange |
| 147 | 1-amino-2-(4-aminosulphonyl-phenyl-thio)-anthraquinone | yellow-red |
| 148 | 1,4-dihydroxy-2-[4-(2-cyanoethylamino)-sulphonyl-phenoxy]-anthraquinone | orange |
| 149 | 1,4-dihydroxy-2-(4-aminosulphonyl-phenoxy)-anthraquinone | orange |
| 150 | 1,4-dihydroxy-2-(4-methylamino-sulphonyl-phenyl-thio)-anthraquinone | scarlet |
| 151 | 1,4-diamino-2-[4-(3-cyano-phenyl-amino)-sulphonyl-phenoxy]-anthraquinone | blue-violet |
| 152 | 1,4-diamino-2,3-bis-(4-amino-sulphonyl-phenoxy)-anthraquinone | red-violet |
| 153 | 1,4-diamino-2-(4-amino-sulphonyl-phenyl-thio)-anthraquinone | reddish blue |
| 154 | 1,4-diamino-2-[4-(3-methoxypropylamino)-sulphonyl-phenyl-sulphonyl]-anthraquinone | reddish blue |
| 155 | 1,4-diamino-anthraquinone-2-sulphonic acid (4-ethyl-amino-sulphonyl-phenyl)ester | reddish blue |
| 156 | 1-hydroxy-4-(3-methylamino-sulphonyl-phenyl-amino)-anthraquinone | blue-violet |
| 157 | 1-hydroxy-4-(4-methyl-3-amino-sulphonyl-phenyl-amino)-anthraquinone | blue-violet |
| 158 | 1-hydroxy-4-(4-methylsulphonyl-amino-phenyl-amino)-anthraquinone | reddish blue |
| 159 | 1-amino-4-[4-(2-cyanoethyl-2-hydroxy-ethyl-amino-sulphonyl)-phenyl-amino]-anthraquinone | blue |
| 160 | 1-amino-4-(2,6-diethyl-4-methyl-3-amino-sulphonyl-phenyl-amino)-anthraquinone | reddish blue |
| 161 | 1-amino-2-bromo-4-(4-methoxy-3-amino-sulphonyl-phenylamino)-anthraquinone | reddish blue |
| 162 | 1-amino-2-phenyl-thio-4-(4-methyl-3-amino-sulphonyl-phenylamino)-anthraquinone | blue |
| 163 | 1-amino-2-phenyl-sulphonyl-4-(3-amino-sulphonyl-phenylamino)-anthraquinone | greenish blue |
| 164 | 1-amino-4-(4-amino-sulphonyl-phenyl-thio)-anthraquinone | red |
| 165 | 1-amino-2-(4-amino-sulphonyl-phenoxy)-4-(4-methylphenyl)-sulphonyl-amino)-anthraquinone | pink |
| 166 | 1-amino-2-(4-amino-sulphonyl-phenoxy)-4-methyl-sulphonyl-amino-anthraquinone | pink |
| 167 | 1-amino-anthraquinone-2-sulphonic acid (4-methoxyphenyl-amide) | red |
| 168 | 1-amino-4-hydroxy-anthraquinone-2-sulphonic acid-(3-trifluoromethyl-phenyl-amide) | red |
| 169 | 1,4-diamino-anthraquinone-2-sulphonic acid amide | blue |
| 170 | 1,4-diamino-anthraquinone-2-sulphonic acid (2-methoxy-ethyl)-amide | blue |
| 171 | 1,5-dihydroxy-4,8-diamino-anthraquinone-2-sulphonic acid ethylamide | blue |
| 172 | 1,5-dihydroxy-4,8-diamino-anthraquinone-2,6-disulphonic acid-(3-methoxypropyl)-amide | blue |
| 173 | 1,4-diamino-2-[5-methylaminosulphonyl-benzoxazolyl-(2)]-anthraquinone | blue |
| 174 | 1-amino-4-(4-methylphenyl-amino)-anthraquinone-2-sulphonic acid-(2-hydroxyethyl)-amide | blue |
| 175 | 1-amino-4-cyclohexyl-amino-anthraquinone-2-sulphonic acid amide | blue |
| 176 | 1-(3-aminosulphonyl-propyl-amino)-anthraquinone | red |
| 177 | 1,4-bis-(3-amino-sulphonyl-propyl-amino)-anthraquinone | blue |
| 178 | 1,5-dihydroxy-4,8-diamino-2-(4-hydroxy-3-ethylamino-sulphonyl-phenyl)-anthraquinone | blue |
| 179 | 1,5-dihydroxy-4,8-diamino-3-(4-hydroxy-3-methylamino-sulphonyl-phenyl)-anthraquinone | blue |
| 180 | 1,5-dihydroxy-8-nitro-4-(3-ethylamino-sulphonyl-phenylamino)-anthraquinone | blue |
| 181 | 1,8-dihydroxy-5-nitro-4-(3-amino-sulphonyl-phenylamino)-anthraquinone | blue |
| 182 | 1,5-dihydroxy-8-amino-4-(3-methylamino-sulphonyl-phenylamino)-anthraquinone | blue |
| 183 | 1,8-dihydroxy-5-amino-4-(3-amino-sulphonyl-phenylamino)-anthraquinone | blue |
| 184 | 1,5-dihydroxy-8-amino-x-chloro-4-(3-amino-sulphonyl-phenylamino)-anthraquinone | blue |
| 185 | 1,5-dihydroxy-8-nitro-x-bromo-4-(3-amino-sulphonyl-phenylamino)-anthraquinone | blue |
| 186 | 1,8-dihydroxy-5-amino-x-bromo-4-(3-amino-sulphonyl-phenylamino)-anthraquinone | blue |
| 187 | 1,8-dihydroxy-5-amino-x-bromo-4-(3-amino-sulphonyl-phenylamino)-anthraquinone | blue |
| 188 | 1,8-dihydroxy-5-methylamino-4-(4-methyl-3-amino-sulphonyl-phenyl-amino)-anthraquinone | blue |
| 189 | 1,9-isothiazolanthrone-2-sulphonic acid (4-bromo-phenyl)-amide | yellow |
| 190 | 5-(2-aminosulphonyl-ethylamino)-1,9-isothiazoloanthrone | yellow |
| 191 | 1,9-pyrazoloanthrone-2-sulphonic acid-N-(2-hydroxyethyl)-N-phenyl-amide | yellow |
| 192 | 5-(2-amino-sulphonyl-ethylamino)-1,9-pyrazoloanthrone | yellow |
| 193 | 4-(3-amino-sulphonyl-phenylamino)-N-methyl-1,9-anthrapyridone | red |
| 194 | 7-(2-hydroxyethyl)-amino-sulphonyl-3,4-phthaloyl-acridone | red |
| 195 | 7-(3-methoxypropyl)-amino-sulphonyl-2-amino-3,4-phthaloyl-acridone | |
| 196 | 1,8-naphthoylene-benzimidazole-Bz-3-sulphonic acid methylamide | yellow |
| 197 | 1,8-naphthoylene-benzimidazole-4-sulphonic acid amide | yellow |
| 198 | 1,8-naphthoylene-benzimidazole-4,5-dicarboxylic acid-(2-methoxy-ethylimide)-Bz-3-sulphonic acid ethylamide | yellow |
| 199 | phthaloylene-(1,8-naphthopyrimidine)-3- or 6-sulphonic acid amide | yellow |
| 200 | 4-(3-amino-sulphonyl-phenyl-amino)-1,9-isothiazolo-anthrone | yellow |
| 201 | 5-(3-amino-sulphonyl-phenyl-amino)-1,9-isothiazolo-anthrone | yellow |
| 202 | 4-(3-methylamino-sulphonyl-phenyl-amino)-1,9-pyrazolo-anthrone | yellow |
| 203 | 5-[3-(2-methoxyethyl-amino-sulphonyl)-phenyl-amino]-1,9-pyrazolo-anthrone | yellow |

EXAMPLE 204

100 Parts polethylene terephthalate filaments are dyed in a dyebath consisting of 1 part 4-phenylamino-3-nitrobenzene-sulphonic acid amide
3 parts oleic acid ethanolamide
3 parts oleyl alcohol eiscosaethylene glycol ether
12 parts of water and
1600 parts of tetrachloroethylene at 115°C for 30 minutes while the liquor is vividly circulating, they are centrifuged and rinsed with tetrachlorethylene at 40°C for 5 minutes. A strong greenish yellow dyeing of very good fastness to sublimination, washing and light is obtained.

An equally satisfactory dyeing is obtained when the tetrachlorethylene is replaced with the same amount of 1,1,2-trichlorethane.

When 1 part 4-phenylamino-3-nitrobenzene-sulphonamide is replaced with a misture of 0.5 parts 4-phenylamino-3-nitrobenzene-sulphonic acid amide and 0.5 parts 4-(4-methoxyphenylamino-3-nitrobenzene-sulphonamide, then a somewhat more reddish strong dyeing is obtained.

Similar dyeings are also obtained when the polyethylene terephthalate filaments are replaced with fibers of anion-modified polyethylene terephthalate (Dacron 64) or anion-modified polyhexamethylene-diamine adipate (Nylon T 844).

The dyestuff used in Example 204 had been prepared as follows: 900 parts of n-butanol saturated with ammonia are mixed with 550 parts of 79% 4-chloro-3-nitrobenzene sulphochloride and the mixture is stirred at 5°–60°C for 1 hour. 200 Parts aniline were added and the mixture was heated to boiling temperature while slowly introducing ammonia, until the dyestuff formation was completed. After cooling, the drystllised product was filtered off with suction, washed with methanol and water and after drying there were obtained 460 parts 4-phenlamino-3-nitrobenzene-sulphonic acid amide = 92 percent of theory; m.p. 155°C.

Example 205

100 Parts of polycarbomate filaments are dyed in a dyebath consisting of 1 part 4-(4-methoxy-phenylamino)-3-nitrobenzenesulphonic acid amide
2.5 parts oleic acid ethanolamide
2.5 parts oleyl alcohol eicosaethylene glycol ether
10 parts of water and
1000 parts tetrachlorethylene as described in Example 204. A yellow dyeing of very good fastness to sublimation, washing and light is obtained.

When the dyestuffs given in Examples 204 and 205 were replaced with the same amount of one of the dyestuffs listed in the folowing Table, then dyeings of equally satisfactory fastness properties were obtained in the shades stated in the Table:

| Example | Dyestuff | Shade |
|---|---|---|
| 206 | 4-(4-ethoxy-phenylamino)-3-nitro-benzene-sulphonic acid methylamide | reddish yellow |
| 207 | 4-(2-methoxy-phenylamino)-3-nitro-benzene-sulphonic acid dimethylamide | reddish yellow |
| 208 | 4-phenylamino-3-nitro-benzene-sulphonic acid-(di-2-hydroxyethyl)-amide | yellow |
| 209 | 4-(4-phenyl-phenylamino)-3-nitro-benzene-sulphonic acid amide | yellow |
| 210 | 4-(4-phenoxy-phenylamino)-3-nitro-benzene-sulphonic acid | reddish yellow |
| 211 | 4-(4-azobenzeneamino)-3-nitro-benzene-sulphonic acid-(di-2-hydroxyethyl-amide | reddish yellow |
| 212 | 4-[4-(2-hydroxyethoxy)-phenylamino]-3-nitro-benzene-sulphonic acid phenyl-amide | reddish yellow |
| 213 | 4-(4-benzyloxy-phenylamino)-3-nitro-benzene-sulphonic acid morpholide | reddish yellow |
| 214 | 4-(3-methoxy-phenylamino)-3-nitro-benzene-sulphonic acid-(4-aminosulphonyl-phenyl)-amide | reddish yellow |
| 215 | 4-(4-methoxycarbonyl-phenylamino)-3-nitro-benzene-sulphonic acid-(2-hydroxyethyl)-amide | greenish yellow |
| 216 | 4-(2,4-dimethoxy-phenylamino)-3-nitro-benzene-sulphonic acid amide | reddish yellow |
| 217 | 4-(4-carboxy-phenylamino)-3-nitro-benzene-sulphonic acid ethylamide | greenish yellow |
| 218 | 4-[4-(2-hydroxyethyl-aminosulphonyl)-phenylamino]-benzene-sulphonic acid-(2-hydroxyethyl)-amide | greenish yellow |
| 219 | 4-(3-fluoro-phenylamino)-3-nitro-benzene-sulphonic acid-(2-methoxyethyl)-amide | greenish yellow |
| 220 | 4-(3-trifluoromethyl-phenylamino)-3-nitro-benzene-sulphonic acid-(2-cyanoethyl)-amide | greenish yellow |
| 221 | 4-(3,4-dichloro-phenylamino)-3-nitro-benzene-sulphonic acid-(3-methoxypropyl)-amide | greenish yellow |
| 222 | 4-(3-cyano-phenylamino)-3-nitro-benzene-sulphonic acid-(4-methylamino-carbonyl-phenyl)-amide | yellow |
| 223 | 4-(2-nitro-phenylamino)-3-nitro-benzene-sulphonic acid piperidide | greenish yellow |
| 224 | 4-(4-methyl-phenylamino)-3-nitro-benzene-sulphonic acid amide | yellow |
| 225 | 4-(4-ethyl-phenylamino)-3-nitro-benzene-sulphonic acid-[4-(2-hydroxyethoxy)-phenyl]-amide | yellow |
| 226 | 4-(4-aminosulphonyl-phenylamino)-3-nitro-benzene-sulphonic acid-(di-2-hydroxyethyl)-amide | greenish yellow |
| 227 | 4-(4-aminosulphonyl-phenylamino)-3-nitro-benzene-sulphonic acid-(3-diethylamino-sulphonyl-phenyl)-amide | greenish yellow |
| 228 | 4-(4-acetylamino-phenylamino)-3-nitro-benzene-sulphonic acid ethylamide | yellow |
| 229 | 4-(4-methylsulphonylamino-phenylamino)-3-nitro-benzene-sulphonic acid phenylamide | yellow |
| 230 | 4-(4-methylsulphonylamino-phenylamino)-3-nitro-benzene-sulphonic acid-(2-hydroxyethyl)-amide | yellow |
| 231 | 4-phenylamino-3-nitro-benzene-sulphonic acid-(4-aminosulphonyl-phenyl)-amide | greenish yellow |
| 232 | 4-(4-methoxy-phenylamino)-3-nitro-benzene-sulphonic acid-(3-methylamino-sulphonyl-phenyl)-amide | reddish yellow |
| 233 | 4-(4-ethoxy-phenylamino)-3-nitro-benzene-sulphonic acid-[3-(2-cyanoethyl-aminosulphonyl)-phenyl]-amide | reddish yellow |
| 234 | 4-(4-methyl-phenylamino)-3-nitro-benzene-sulphonic acid-(4-aminosulphonyl-phenyl)-amide | yellow |
| 235 | 4-(3-trifluoromethyl-phenylamino)-3-nitro-benzene-sulphonic acid-[3-(2-cyanoethyl-2-hydroxyethyl-aminosulphonyl)-phenyl]-amide | greenish yellow |
| 236 | 4-phenylamino-3-nitro-benzene-sulphonic acid-[4-(2-aminosulphonylethoxy)-phenyl]-amide | greenish yellow |
| 237 | 4-[4-(3-aminosulphonyl-propoxy)-phenyl-amino]-3-nitro-benzene-sulphonic acid-(3-chloro-phenyl)-amide | reddish yellow |
| 238 | 4-phenylamino-3-nitro-benzene-sulphonic acid-(4-aminosulphonyl-phenyl) ester | yellow |
| 239 | 4-(4-methoxy-phenylamino)-3-nitrobenzene-sulphonic acid-(3-methylamino-sulphonyl-phenyl) ester | reddish yellow |
| 240 | 4-(3-ethoxy-phenylamino)-3-nitrobenzene-sulphonic acid-[4-(di-2-hydroxy-ethyl-sulphonylamino)-phenyl] ester | reddish yellow |
| 241 | 4-(4-aminocarbonyl-phenylamino)-3-nitrobenzene-sulphonic acid-(4-ethylamino-sulphonyl-phenyl) ester | greenish yellow |
| 242 | 4-(3-acetylamino-phenylamino)-3-nitro-benzene-sulphonic acid-(4-aminosulphonyl-phenyl) ester | yellow |
| 243 | 4-phenylamino-3-nitro-benzoic acid (4-aminosulphonyl-phenyl) amide | yellow |
| 244 | 4-(4-ethoxyphenylamino)-3-nitro-benzoic acid-[3-(2-hydroxyethylamino-sulphonyl)-phenyl]-amide | reddish yellow |
| 245 | 4-(2,4-dimethoxy-phenylamino)-3-nitro-benzoic acid-(4-methylaminosulphonyl-phenyl)-amide | reddish yellow |
| 246 | 4-(4-methyl-phenylamino)-3-nitro-benzoic acid-(3-methylaminosulphonyl-phenyl)-amide | yellow |
| 247 | 4-(4-nitro-phenylamino)-3-nitro-benzoic acid-(3-pyrrolidinosulphonyl-phenyl)-amide | yellow |
| 248 | 4-(3-bromo-phenylamino)-3-nitro-benzoic acid-(4-hydroxy-3-n-propyl-amino-sulphonyl-phenyl)-amide | yellow |
| 249 | 4-(4-acetylamino-phenylamino)-3-nitro-benzoic acid-(4-thiomorpholinosulphonyl-phenyl)-amide | yellow |
| 250 | 4-(4-methylsulphonylamino-phenylamino)-3-nitro-benzoic acid-(3-dimethylamino-sulphonyl-phenyl)-amide | yellow |
| 251 | 4-phenylamino-3-nitro-benzoic acid-(4-aminosulphonyl-phenyl) ester | yellow |
| 252 | 4-(4-methoxy-phenylamino)-3-nitro-benzoic acid-(3-methylaminosulphonyl-phenyl) ester | yellow |
| 253 | 4-(3-methylsulphonylamino-phenylamino)-3-nitro-benzoic acid-[4-(3-hydroxypropyl-aminosulphonyl)-phenyl] ester | yellow |
| 254 | 4-(4-methylsulphonyl-phenylamino)-3-nitro-benzene-sulphonic acid-4-(amino-sulphonyl-phenyl)-amide | greenish yellow |
| 255 | 4-(4-methylsulphonyl-phenylamino)-3-nitro-benzene sulphonic acid-(2-hydroxyethyl)-amide | greenish yellow |
| 256 | 4-(3-hydroxymethyl-phenylamino)-3-nitro-benzene-sulphonic acid-(4-methyl-amino-sulphonyl-phenyl)-amide | yellow |
| 257 | 4-(3-hydroxymethyl-phenylamino)-3-nitro-benzene-sulphonic acid-morpholide | yellow |
| 258 | 4-(4-hydroxyethyl-phenylamino)-3-nitro-benzene-sulphonic acid-(3-aminosulphonyl-phenyl)-amide | yellow |
| 259 | 4-(4-hydroxyethyl-phenylamino)-3-nitro-benzene-sulphonic acid amide | yellow |

EXAMPLE 260

100 Parts of yarn of polyethylene terephthalate fibres are dyed in a dyebath consisting of 1 part of the quinophthalone dyestuff of the formula

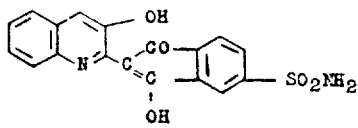

2.5 parts oleic acid ethanolamide
2.5 parts oleyl alcohol
10 parts of water and
1600 parts tetrachloroethylene as described in Example 204. A clear yellow dyeing is obtained, which is characterised by good fastness to sublimation, washing and light.

An equally satisfactory dyeing is obtained when the above quinophthaline-sulphonamide dyestuff is replaced with a bromination product which contains about 1 bromine atom per molecule and can be obtained in known manner by bromination in nitrobenzene or glacial acetic acid.

Clear yellow dyeings are also obtained when the dyestuff mentioned in Example 260 is replaced with equal amounts of the quinophthalone-sulphonic acid amides listed in the following Table:

| Example | $R_1$ | $R_2$ | $R_3$ | $N{<}^B_{B_1}$ |
|---|---|---|---|---|
| 261 | H | H | H | NH-CH$_3$ |
| 262 | H | H | H | N(CH$_3$)$_2$ |
| 263 | H | H | H | NH-C$_2$H$_5$ |
| 264 | H | H | H | NH-CH$_2$-CH$_2$-OH |
| 265 | H | H | H | N(CH$_2$-CH$_2$-OH)$_2$ |
| 266 | H | H | H | NH-CH$_2$-CH$_2$-CN |
| 267 | Cl | H | H | N⟨◯⟩O |
| 268 | Br | H | H | NH$_2$ |
| 269 | Cl | Cl | H | NH-CH$_3$ |
| 270 | NO$_2$ | H | H | NH$_2$ |
| 271 | CH$_3$O | H | H | NH-CH$_2$-CH$_2$-OH |
| 272 | CH$_3$-CO-NH | H | H | N(CH$_3$)$_2$ |
| 273 | H | H | CH$_3$ | NH$_2$ |
| 274 | H | H | CH$_3$O | NH$_2$ |

Greenish yellow dyeings are obtained when the quinophthalone-sulphonamide dyestuff mentioned in Example 260 is replaced with equal parts of one of the methine dyestuffs of the formulae

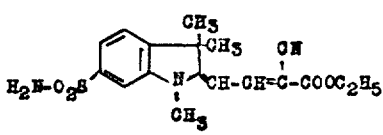

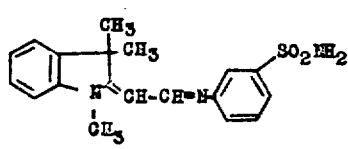

or with a styryl dyestuff of the formula

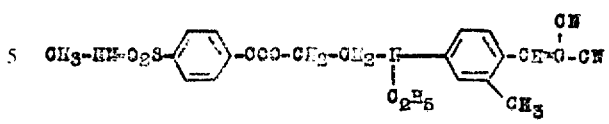

EXAMPLE 275

100 Parts of a fabric of textured polyethylene terephthalate fibres are introduced at room temperature, without previous cleaning, into a dyebath prepared from 1 part 1-amino-4-hydroxy-2-[4-(4'-hydroxyanilinosulphonyl)-phenoxy]-anthraquinone and
1000 parts tetrachloroethylene.

The bath is heated to 115°C within 10 minutes and kept at the same temperature for 30 minutes, while the liquor is vividly circulating. The liquor is then seperated and the dyed material is rinsed with fresh solvent at about 40°C for 5 minutes. After separating of the rinsing liquor, the dyed material is centrifuged and dried in an air current.

There is obtained a strong red dyeing of excellent fastness to washing, light, rubbing and sublimation.

An equivalent red dyeing was obtained in the same way on a knitted fabric of poly-ε-caprolactame.

EXAMPLE 276

50 Parts of a fabric of polyester fibres are introduced at room temperature into a dyebath prepared from 1 part 1-amino-4-hydroxy-2-[4-(4'-hydroxyanilinosulphonyl)-phenoxy]-anthraquinone and
1.5 parts oleic acid ethanolamide
1.5 parts oleyl alcohol eicosaethylene glycol ether
6 parts of water and
500 parts tetrachloroethylene.

The bath is heated to 120°C within 10 minutes and kept at the same temperature for 45 minutes while the liquor is vividly circulating. After seperation of the dye liquor, the dyed material is rinsed with fresh solvent at 40°C and, after removal of the rinsing liquor, dried in an air current. A brilliant red dyeing of excellent fastness to washing, rubbing, light and sublimation is obtained.

EXAMPLE 277

100 parts of fibre yarn of poly-ε-caprolactame are introduced at room temperature into a dyebath containing 1 part 1,4-diamino-2-[4-(4'-hydroxyanilinosulphonyl)-phenylthio]-anthraquinone in
1000 parts tetrachloroethylene.

The bath is heated to 100°C within 20 minutes and kept at the same temperature for 40 minutes while the liquor is vividly circulating. After this period of time, the liquor is separated, the dyeing is briefly rinsed with fesh solvent and dried in an air current after centrifuging. A brillant reddish blue dyeing of excellent fastness to washing, light, rubbing and sublimation is obtained.

An equivalent dyeing was obtained in the same manner on a yarn of poly-hexmethylene diamine adipate fibres.

EXAMPLE 278

100 Parts of a fabric of textured polyethylene terephthalate fibres are introduced at room temperture, without previous cleaning, into a dyebath prepared from 1 part 4-(4-hydroxyphenylamino)-3-nitro-benzenesulphonic acid-4-(hydroxyphenyl)-amide and
1000 parts tetrachloroethylene.

The bath is heated to 115°C within 10 minutes and kept at the same temperature for 30 minutes, while the liquor is vividly circulating. The liquid is then separated and the dyed material is rinsed with fresh solvent at about 40°C for 5 minutes. After separating of the rinsing liquor, the dyed material is centrifuged and dried in an air current. A strong yellow dyeing of excellent fastness to washing, rubbing, light and sublimation is obtained.

An equivalent yellow dyeing was obtained in the same manner on a fabric of poly-ϵ-caprolactame fibres.

EXAMPLE 279

50 Parts of a fabric of polyester fibres are introduced at room temperature into a dyebath prepared from 1 part 4-(4-hydroxyphenylamino)-3-benzenesulphonic acid-(4-hydroxyphenyl)-amide
1.5 parts oleic acid ethanolamide
1.5 parts oleyl alcohol eicosaethylene glycol ether
6 parts of water and
500 parts tetrachloroethylene.

The bath is heated to 115°C within 10 minutes and kept at the same temperature for 30 minutes, while the liquor is vividly circulating. The liquor is then separated and the dyed material is rinsed with fresh solvent at about 40°C for 5 minutes. After separating of the rinsing liquor, the dyed material is the dyed material is rinsed with fresh solvent at 40°C and, after removal of the rinsing liquor, dried in an air current. A brillant yellow dyeing of excellent fastness to wasing, rubbing, light and sublimation is obtained.

I claim:

1. Process for dyeing synthetic fiber material by exhaustion comprising introducing synthetic fiber material into a dyebath which is a dispersion consisting essentially of A. organic solvent
   B. anthraquinone dyestuff containing 1 to 3 sulfonamide groups and largely insoluble in said dyebath; and
   C. up to 1% by weight of said organic solvent of water; said organic solvent consisting of water immiscible aliphatic halogented hydrocarbon; and dyeing at a temperature of 60° to 170°C for 10–60 minutes until the dyebath is exhausted;
   said anthraquinone dyestuff free of reactive groups, acid groups and carboxamide groups having the formula

[A] (X—Y—D)$_n$ 

in which
   A is an unsubstituted anthraquinone radical or an anthraquinone radical substituted with halogen, hydroxy, $C_1$-$C_4$-alkoxy, nitro, amino, $C_1$-$C_4$-alkylamino, cycloalkylamino, arylsulfonylamino or $C_1$-$C_4$-alkylsulfonylamino groups;
   D is a sulfonamide group;
   X is a single C—C-bond, —NH—, —O—, —S—, -SO$_2$- or —SO$_3$—;
   Y is a single C—C-bond, arylene, $C_1$-$C_4$-alkylene, $C_1$-$C_4$-alkylene-arylene, $C_1$-$C_4$-alkylene-oxyarylene or alkylene-thioarylene; and
   $n$ is 1 or 2.

2. The process of claim 1 in which Y is $C_1$-$C_4$-alkylene.

3. The process of claim 1 in which said anthraquinone dyestuff has the formula

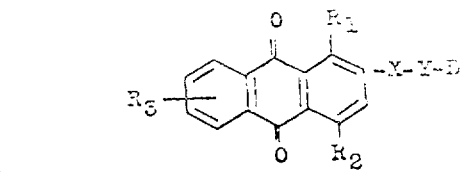

in which
R$_1$ is hydroxy or amino;
R$_2$ is hydroxy, amino, phenylsulfonylamino or $C_1$-$C_4$-alkylsulfonylamino;
R$_3$ is hydrogen, chlorine or fluorine;
X is —O—, —S—, —SO$_2$— or —SO$_3$—;
Y is a phenylene, ethylene-oxyphenylene, ethylene-thiophenylene, $C_1$-$C_4$-alkylene-phenylene or $C_1$-$C_4$ alkylene; and
D is a sulfonamide group.

4. The process of claim 1 in which said anthraquinone dyestuff has the formula

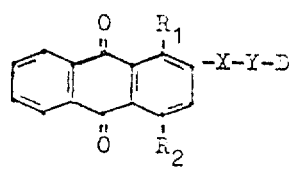

in which
R$_1$ is amino;
R$_2$ is hydroxy or amino
X is —O— or —S—;
Y is phenylene; and
D is

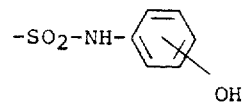

5. The process of claim 1 in which said anthraquinone dyestuff has the formula
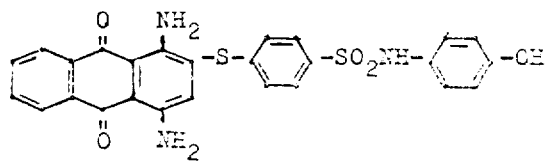
6. The process of claim 1 in which said anthraquinone dyestuff has the formula
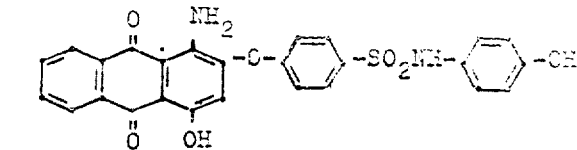
7. The process of claim 1 in which said sulfonamide group has the formula
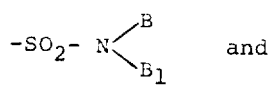  and
  is
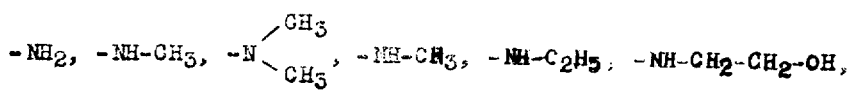
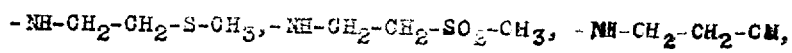
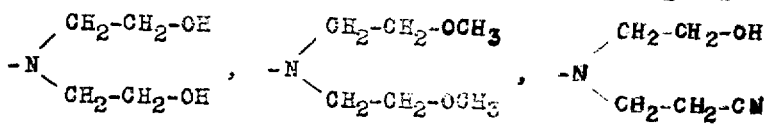
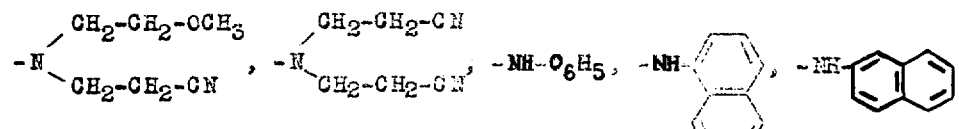
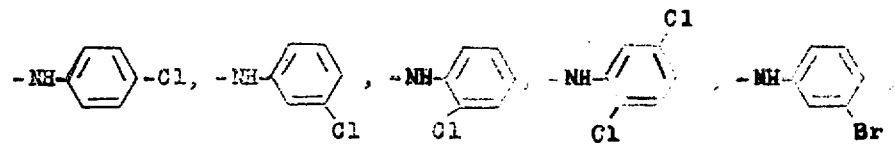
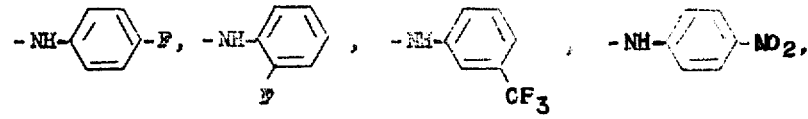
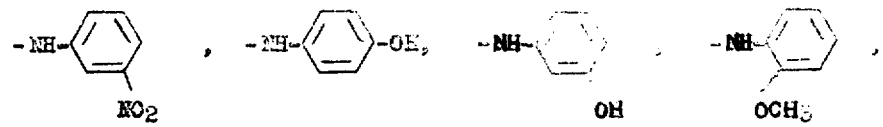
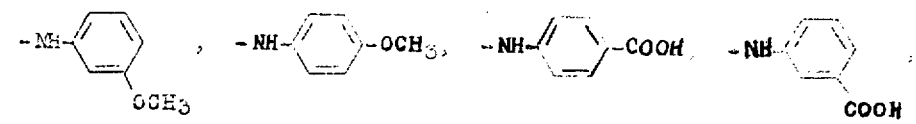
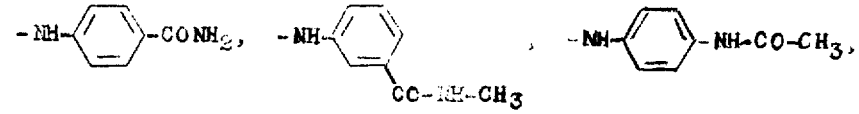

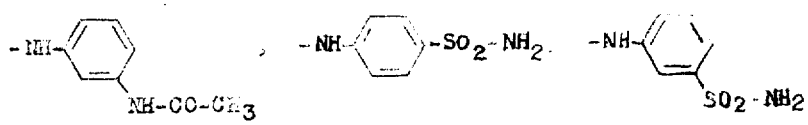

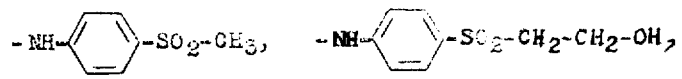

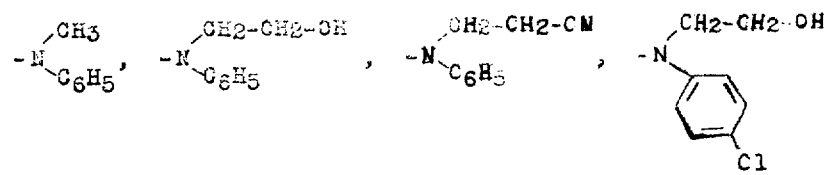

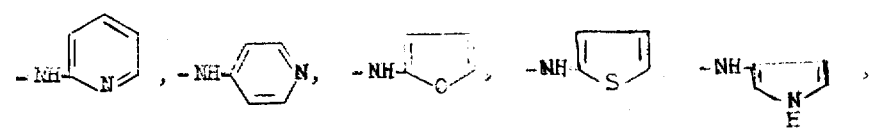

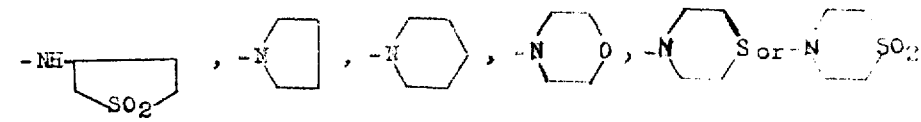

8. The process of claim 1 in which said water-immiscible aliphatic halogenated hydrocarbon has a boiling point between 40° and 170°C.

9. The process of claim 1 in which said synthetic fiber material is polyester, polyamide, cellulose, triacetate, cellulose 2½ acetate, polyacrylonitrile, or polyurethane.

10. The process of claim 1 in which said synthetic fiber material is polyester.

11. The process of claim 1 in which said synthetic fiber material is polyamide.

12. The process of claim 1 in which said dyebath contains 0.05 to 2 percent by weight of non-ionic dyeing auxiliary based on the weight of said aliphatic halogenated hydrocarbon.

* * * * *